US011158057B2

United States Patent
Zhang et al.

(10) Patent No.: US 11,158,057 B2
(45) Date of Patent: Oct. 26, 2021

(54) DEVICE, METHOD, AND GRAPHICAL USER INTERFACE FOR PROCESSING DOCUMENT

(71) Applicant: HUAWEI TECHNOLOGIES CO., LTD., Guangdong (CN)

(72) Inventors: Yunchao Zhang, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 16/473,678

(22) PCT Filed: Dec. 30, 2016

(86) PCT No.: PCT/CN2016/113987
§ 371 (c)(1),
(2) Date: Jun. 26, 2019

(87) PCT Pub. No.: WO2018/120238
PCT Pub. Date: Jul. 5, 2018

(65) Prior Publication Data
US 2019/0355122 A1    Nov. 21, 2019

(51) Int. Cl.
*G06T 7/13* (2017.01)
*G06T 7/90* (2017.01)

(52) U.S. Cl.
CPC .............. *G06T 7/13* (2017.01); *G06T 7/90* (2017.01); *G06T 2207/10024* (2013.01); *G06T 2207/30176* (2013.01)

(58) Field of Classification Search
CPC ... G06T 7/13; G06T 7/90; G06T 2207/10024; G06T 2207/30176
See application file for complete search history.

(56) References Cited

U.S. PATENT DOCUMENTS 7,171,056 B2    1/2007  Zhang et al.
7,301,564 B2 *  11/2007 Fan ................. H04N 1/387
                                                    348/222.1
(Continued)

FOREIGN PATENT DOCUMENTS

CN    101246549 A    8/2008
CN    101433075 A    5/2009
(Continued)

OTHER PUBLICATIONS

PCT International Search Report and Written Opinion issued in International Application No. PCT/CN2016/113,987, dated Sep. 30, 2017, 27 pages (With English Translation).
(Continued)

*Primary Examiner* — Gregory M Desire
(74) *Attorney, Agent, or Firm* — Fish & Richardson P.C.

(57) ABSTRACT

A method for detecting a document edge is provided. The method includes: obtaining multi-color channel data of each pixel in a color image (103), where the multi-color channel data includes two-dimensional coordinate values of the pixel and a value of the pixel on each color channel; performing line detection on the multi-color channel data of each pixel in the color image (105); and detecting a quadrilateral based on preset condition and some or all of straight lines obtained by performing the line detection (107). According to the foregoing method, a success rate of detecting a document edge can be increased.

20 Claims, 23 Drawing Sheets

(56) References Cited

U.S. PATENT DOCUMENTS

| | | | |
|---|---|---|---|
| 8,781,152 B2* | 7/2014 | Momeyer | G06K 9/228 |
| | | | 382/100 |
| 8,855,375 B2* | 10/2014 | Macciola | H04N 1/387 |
| | | | 382/112 |
| 9,122,921 B2* | 9/2015 | Beato | G06K 9/00463 |
| 10,115,031 B1* | 10/2018 | Pashintsev | G06K 9/4609 |
| 10,503,997 B2* | 12/2019 | Zagaynov | G06K 9/481 |
| 10,657,421 B2* | 5/2020 | Martin | G06K 9/4604 |
| 2004/0165786 A1 | 8/2004 | Zhang et al. | |
| 2005/0169531 A1* | 8/2005 | Fan | G06T 7/181 |
| | | | 382/199 |
| 2007/0253040 A1 | 11/2007 | Lee et al. | |
| 2011/0285874 A1* | 11/2011 | Showering | G06K 9/228 |
| | | | 348/231.99 |
| 2014/0032406 A1* | 1/2014 | Roach | G06Q 20/042 |
| | | | 705/42 |
| 2014/0126811 A1 | 5/2014 | Ihara | |
| 2014/0368891 A1 | 12/2014 | Beato et al. | |
| 2015/0256695 A1* | 9/2015 | Showering | H04N 1/00774 |
| | | | 358/505 |
| 2015/0347837 A1 | 12/2015 | Wu et al. | |
| 2017/0124698 A1 | 5/2017 | Kato et al. | |
| 2019/0355122 A1* | 11/2019 | Zhang | G06T 7/90 |

FOREIGN PATENT DOCUMENTS

| | | |
|---|---|---|
| CN | 101558425 A | 10/2009 |
| CN | 101681432 A | 3/2010 |
| CN | 101820489 A | 9/2010 |
| CN | 102394900 A | 3/2012 |
| CN | 102970456 A | 3/2013 |
| CN | 104246678 A | 12/2014 |
| CN | 105184265 A | 12/2015 |
| CN | 105283884 A | 1/2016 |
| CN | 105339951 A | 2/2016 |
| CN | 105450900 A | 3/2016 |
| CN | 105830091 A | 8/2016 |
| CN | 105955599 A | 9/2016 |
| CN | 106063240 A | 10/2016 |
| WO | 2016065551 A1 | 5/2016 |

OTHER PUBLICATIONS

Office Action issued in Chinese Application No. 201680091829.4 dated Sep. 15, 2020, 21 pages (with English translation).
Extended European Search Report issued in European Application No. 16924927.3 dated Nov. 13, 2019, 6 pages.
Office Action issued in Chinese Application No. 201680091829.4 dated Jun. 3, 2021, 6 pages (with English translation).

* cited by examiner

| Module | No. |
|---|---|
| Desktop applet creation module | 150 |
| Search module | 151 |
| Video and music player module | 152 |
| Drawing module | 380 |
| Presentation module | 382 |
| Word processing module | 384 |
| Web page creation module | 386 |
| Disk editing module | 388 |
| Spreadsheet module | 390 |
| Voice/audio recorder module | 163 |
| Notification module | 165 |
| ⋮ | |
| Device/global internal status | 157 |
| Camera film | 159 |
| Digital image pipeline | 161 |

FIG. 3C

DEVICE, METHOD, AND GRAPHICAL USER INTERFACE FOR PROCESSING DOCUMENT

TECHNICAL FIELD

This specification relates to document processing electronic devices, including but not limited to an electronic device, a method, and a graphical user interface for detecting a document edge.

BACKGROUND

A user may use a mobile device (for example, a camera, a mobile phone, a wearable device, or a network camera) with a photographing function to take a photo or record a video. For example, in a conference room, a person may use a mobile phone to photograph information on a whiteboard, a slideshow, a file, or the like at any time without manually recording the information. Therefore, it is very convenient.

However, when a target object is photographed by using these mobile devices, because of limitation of factors such as a photographing distance and angle, there is usually a specific included angle between an image plane of a camera and a photographed plane. Therefore, an image is distorted to a relatively great extent. For example, an original rectangular target image may be distorted and become any quadrilateral such as a trapezoid, and such distortion is referred to as tilt distortion. To resolve this problem, algorithms such as quadrilateral detection and quadrilateral correction usually need to be used to perform tilt correction on an input image to obtain the target image. In the quadrilateral detection algorithm, a rectangular edge of a target image of a document, a whiteboard, or the like is mainly detected by using an edge extraction algorithm in computer vision, to remove a non-target area outside a rectangular frame. In consideration of image projection distortion caused by a photographing angle of view, projection correction is usually performed, by using the quadrilateral correction algorithm, on a rectangular area obtained by using the quadrilateral detection algorithm, to obtain a target image with relatively high quality.

An existing quadrilateral detection algorithm is converting a color image into a single-channel grayscale image and then performing quadrilateral edge detection, without consideration of color and saturation information of the image. In some scenarios in which the foreground and the background have similar colors, a detection effect of a document edge is poor, and even in some scenarios in which there is a relatively great contrast between the foreground and the background from a perspective of human eyes, a document edge can still hardly be detected.

Another existing quadrilateral detection algorithm is analyzing each color channel in a color image to determine a corresponding busyness indicator that denotes complexity of image data, and selecting a color channel with minimum busyness to detect a document edge. In this solution, color, saturation, and brightness information of the color image are considered. However, only a channel with minimum complexity is used in a process of detecting the document edge, and therefore this solution may actually still be classified as a single-channel processing algorithm. A minimum complexity rule is based on a premise that a document edge is distinct. A minimum-complexity-based channel selection rule can ensure that some non-real-edge interference is ignored, but cannot resolve a problem caused when a document edge is indistinct. For example, during detection of a white document on a pure white table, color channel complexity is a minimum, but relatively few document edges are detected, and a real quadrilateral cannot be determined.

SUMMARY

A highly efficient method and interface are required for an electronic device to respond to an operation of photographing a document or processing a document by the electronic device. Such a method and an interface can be used to respond to a customized requirement of a user more quickly, efficiently, and intelligently, to increase a success rate of detecting a document edge by the electronic device, thereby avoiding a case in which the electronic device cannot detect the document edge.

In some embodiments of this specification, the foregoing method and interface are provided by using a disclosed electronic device. In some embodiments, the electronic device is portable (for example, a notebook computer, a tablet computer, a handheld device, or a wearable device). In some embodiments, the electronic device has a touchpad. In some embodiments, the electronic device has a touch-sensitive display (also referred to as a "touchscreen", a "touchscreen display", or a "display with a touch-sensitive surface"). In some embodiments, the electronic device has a graphical user interface (GUI), one or more processors, a memory, and one or more modules, programs, or instruction sets that are stored in the memory and that are used to perform a plurality of functions. In some embodiments, the user interacts with the GUI mainly through a finger touch and/or a gesture on the touch-sensitive surface. In some embodiments, these functions may include image editing, drawing, presentation, word processing, web page creation, disk editing, spreadsheet creation, playing games, making and answering a call, a video conference, sending and receiving an entail, instant message communication, exercise support, digital photography, digital video recording, network browsing, digital music play, and/or digital video play. Executable instructions used to perform these functions may be included in a non-transitory computer readable storage medium or another computer program product that is configured to be executed by the one or more processors.

According to a first aspect, an electronic device is provided. The device includes a display, one or more processors, a memory, a plurality of applications, and one or more programs. The one or more programs are stored in the memory and configured to be executed by the one or more processors. The one or more programs include an instruction. The instruction is used to perform the following operations: obtaining multi-color channel data of each pixel in a color image, where the multi-color channel data includes two-dimensional coordinate values of the pixel and a value of the pixel on each color channel; performing line detection on the multi-color channel data of each pixel in the color image; and detecting a quadrilateral based on preset condition and some or all of straight lines obtained by performing the line detection, where the preset condition include that a value of an included angle between opposite sides of the quadrilateral is less than a first threshold, a value of an included angle between adjacent sides of the quadrilateral falls within a preset angle value domain, and a distance between the opposite sides of the quadrilateral is greater than a second threshold, where the first threshold is an integer greater than zero, and the second threshold is an integer greater than zero. Such an electronic device can respond to a customized requirement of a user more efficiently and intelligently, to increase a success rate of detecting a document edge by the electronic device. Optionally, the color image is preprocessed, and the preprocessing includes but is not limited to color space conversion and/or histogram equalization.

In a first possible implementation of the first aspect, the preset condition further include that a ratio of a quantity of actually detected edge pixels to a circumference of the quadrilateral is maximum. In this way, the detected quadrilateral more approximates to a contour formed by actual pixels.

In a second possible implementation of the first aspect, the instruction is further used to perform the following operation:

before the obtaining multi-color channel data of each pixel in a color image, further preprocessing the color image, where the preprocessing includes at least one of color space conversion or histogram equalization. The step of color space conversion and/or the step of histogram equalization are/is added, so that a success rate of detecting an edge can be further increased, thereby reducing a possibility of misjudgment. The histogram equalization is a method for increasing an image contrast, so that a rate of detecting a weak edge can be increased.

In a third possible implementation of the first aspect, the instruction is further used to perform the following operations; and the performing line detection on the multi-color channel data of each pixel in the color image includes:

S1: calculating a gradient value and a gradient direction, on each color channel, of each pixel in the color image; S2: marking pixels whose maximum gradient values on all the color channels are greater than a third threshold as being in a first state; and S3: selecting, from a plurality of pixels marked as being in the first state, a pixel whose maximum gradient value on all the color channels is maximum as a start point, and performing line detection on all the color channels to obtain straight lines corresponding to all the color channels; and storing a longest straight line in the straight lines that are obtained by performing the line detection starting from the start point and that are corresponding to all the color channels, adding the longest straight line to a candidate document edge list, and marking a point on the longest straight line on all the color channels as being in a second state, where step S3 is repeatedly performed until all pixels in the color image are marked as being in the second state.

In a fourth possible implementation of the first aspect, the instruction is further used to perform the following operation; and the selecting, from a plurality of pixels marked as being in the first state, a pixel whose maximum gradient value on all the color channels is maximum as a start point, and performing line detection on all the color channels to obtain straight lines corresponding to all the color channels includes: performing the following operations on each of all color channels of the start point: searching, in a direction perpendicular to the gradient direction of the start point, for a pixel marked as being in the first state, until a quantity of pixels marked as being in the second state in a search path is greater than a third threshold; and determining a straight line obtained by performing the line detection, where two endpoints of the straight line are the start point and an end point that is in the search path, and a quantity of pixels marked as being in the first state in the search path is greater than a fourth threshold.

In a fifth possible implementation of the first aspect, the instruction is further used to perform the following operations; and the performing line detection on the multi-color channel data of each pixel in the color image includes: performing Canny edge detection on each of all multi-color channels in the color image, marking all detected edges on all the multi-color channels as edge points, and constructing a multi-color channel hybrid edge; and performing Hough line detection on the edge points on the multi-channel hybrid edge, and adding a detected straight line to a candidate document edge list.

In a sixth possible implementation of the first aspect, the instruction is further used to perform the following operations; and the performing line detection on the multi-color channel data of each pixel in the color image includes:

calculating complexity $x(i)$ of each color channel in the color image, where i is a color channel number, $i=0, 1, \ldots$, or $n-1$, n is a quantity of color channels, and the complexity includes information entropy of the color image or a JPG compression rate of the color image; and performing line detection on each color channel, sorting straight lines based on values of lengths, selecting $m \times f(x(i))$ straight lines with relatively long lengths, and adding the straight lines to a candidate document edge list, where $f(x(i))$ is a value between 0 and 1, m is a quantity of candidate document edges, and $m \times f(x(i))$ is a quantity of retained straight lines of a color channel i.

In a seventh possible implementation of the first aspect, the instruction is further used to perform the following operations; and the detecting a quadrilateral based on preset condition and some or all of straight lines obtained by performing the line detection includes: classifying, into four types based on tilt angles and locations, candidate straight lines obtained by performing the line detection, where the four types include: up, down, left, and right; cyclically selecting a straight line from each type of straight line, and constructing a set of quadrilaterals based on the preset condition; and selecting, from the set of quadrilaterals, a quadrilateral with a maximum ratio as a result of edge detection, where the ratio is a value obtained by dividing the quantity of actually detected edge pixels by a circumference of a fitting quadrilateral.

In an eighth possible implementation of the first aspect, the instruction is further used to perform the following operation: performing at least one of the following processing on the detected quadrilateral: estimating an original ratio of the quadrilateral; estimating a posture projection matrix; correcting the quadrilateral; or enhancing the image.

According to a second aspect, a method is provided. The method is applied to an electronic device and includes:

obtaining multi-color channel data of each pixel in a color image, where the multi-color channel data includes two-dimensional coordinate values of the pixel and a value of the pixel on each color channel; performing line detection on the multi-color channel data of each pixel in the color image; and detecting a quadrilateral based on preset condition and some or all of straight lines obtained by performing the line detection, where the preset condition include that a value of an included angle between opposite sides of the quadrilateral is less than a first threshold, a value of an included angle between adjacent sides of the quadrilateral falls within a preset angle value domain, and a distance between the opposite sides of the quadrilateral is greater than a second threshold, where the first threshold is an integer greater than zero, and the second threshold is an integer greater than zero.

In a first possible implementation of the second aspect, the preset condition further include that a ratio of a quantity of actually detected edge pixels to a circumference of the quadrilateral is maximum. In this way, the detected quadrilateral more approximates to a contour formed by actual pixels.

In a second possible implementation of the second aspect, the method further includes:

before the obtaining multi-color channel data of each pixel in a color image, further preprocessing the color image, where the preprocessing includes at least one of color space conversion or histogram equalization. The step of color space conversion and/or the step of histogram equalization are/is added, so that a success rate of detecting an edge can be further increased, thereby reducing a possibility of misjudgment.

In a third possible implementation of the second aspect, the method further includes:

the performing line detection on the multi-color channel data of each pixel in the color image includes:

S1: calculating a gradient value and a gradient direction, on each color channel, of each pixel in the color image; S2: marking pixels whose maximum gradient values on all the color channels are greater than a third threshold as being in a first state; and S3: selecting, from a plurality of pixels marked as being in the first state, a pixel whose maximum gradient value on all the color channels is maximum as a start point, and performing line detection on all the color channels to obtain straight lines corresponding to all the color channels; and storing a longest straight line in the straight lines that are obtained by performing the line detection starting from the start point and that are corresponding to all the color channels, adding the longest straight line to a candidate document edge list, and marking a point on the longest straight line on all the color channels as being in a second state, where step S3 is repeatedly performed until all pixels in the color image are marked as being in the second state.

In a fourth possible implementation of the second aspect, the selecting, from a plurality of pixels marked as being in the first state, a pixel whose maximum gradient value on all the color channels is maximum as a start point, and performing line detection on all the color channels to obtain straight lines corresponding to all the color channels includes: performing the following operations on each of all color channels of the start point: searching, in a direction perpendicular to the gradient direction of the start point, for a pixel marked as being in the first state, until a quantity of pixels marked as being in the second state in a search path is greater than a third threshold; and determining a straight line obtained by performing the line detection, where two endpoints of the straight line are the start point and an end point that is in the search path, and a quantity of pixels marked as being in the first state in the search path is greater than a fourth threshold.

In a fifth possible implementation of the second aspect, the performing line detection on the multi-color channel data of each pixel in the color image includes: performing Canny edge detection on each of all multi-color channels in the color image, marking all detected edges on all the multi-color channels as edge points, and constructing a multi-color channel hybrid edge; and performing Hough line detection on the edge points on the multi-channel hybrid edge, and adding a detected straight line to a candidate document edge list.

In a sixth possible implementation of the second aspect, the performing line detection on the multi-color channel data of each pixel in the color image includes: calculating complexity $x(i)$ of each color channel in the color image, where i is a color channel number, i=0, 1, . . . , or n−1, n is a quantity of color channels, and the complexity includes information entropy of the color image or a JPG compression rate of the color image; and performing line detection on each color channel, sorting straight lines based on values of lengths, selecting m×f(x(i)) straight lines with relatively long lengths, and adding the straight lines to a candidate document edge list, where $f(x(i))$ is a value between 0 and 1, m is a quantity of candidate document edges, and m×f(x(i)) is a quantity of retained straight lines of a color channel i.

In a seventh possible implementation of the second aspect, the detecting a quadrilateral based on preset condition and some or all of straight lines obtained by performing the line detection includes: classifying, into four types based on tilt angles and locations, candidate straight lines obtained by performing the line detection, where the four types include: up, down, left, and right; cyclically selecting a straight line from each type of straight line, and constructing a set of quadrilaterals based on the preset condition; and selecting, from the set of quadrilaterals, a quadrilateral with a maximum ratio as a result of edge detection, where the ratio is a value obtained by dividing the quantity of actually detected edge pixels by a circumference of a fitting quadrilateral.

In an eighth possible implementation of the second aspect, the method further includes the following operation:

performing at least one of the following processing on the detected quadrilateral: estimating an original ratio of the quadrilateral; estimating a posture projection matrix; correcting the quadrilateral; or enhancing the image.

According to another aspect, an electronic device is provided. The electronic device includes a display, one or more processors, a memory, a plurality of applications, and one or more programs. The one or more programs are stored in the memory and configured to be executed by the one or more processors. The one or more programs include an instruction used to perform the method according to the second aspect.

According to another aspect, a computer readable storage medium storing one or more programs is provided. The one or more programs include an instruction, and when the instruction is executed by an electronic device that includes a display and a plurality of applications, the electronic device performs the method according to the second aspect.

According to another aspect, a graphical user interface on an electronic device is provided. The electronic device includes a display, a memory, a plurality of applications, and one or more processors configured to execute one or more programs stored in the memory. The graphical user interface includes a user interface displayed by using the method according to the second aspect, and the display includes a touch-sensitive surface and a display screen.

According to another aspect, an electronic device is provided. The electronic device includes a display, and the display includes a touch-sensitive surface and a display screen, a plurality of applications, and an apparatus or a module or a unit configured to perform the method according to the second aspect.

According to another aspect, an information processing apparatus used in an electronic device is provided. The electronic device includes a display and a plurality of applications. The information processing apparatus includes an apparatus configured to perform the method according to the second aspect, and the display includes a touch-sensitive surface and a display screen.

Based on the foregoing technical solutions, the electronic device can increase a success rate of detecting a document edge when a document and a background are not very distinct from each other.

BRIEF DESCRIPTION OF DRAWINGS

To better understand the foregoing embodiments of the present invention and the additional embodiments of the present invention, refer to descriptions of the following embodiments with reference to the following accompanying drawings. In the accompanying drawings, a same reference numeral indicates a corresponding component in all the accompanying drawings.

FIG. 3A to FIG. 3C are a block diagram of an electronic device according to some embodiments;

DESCRIPTION OF EMBODIMENTS

Figure 1A:
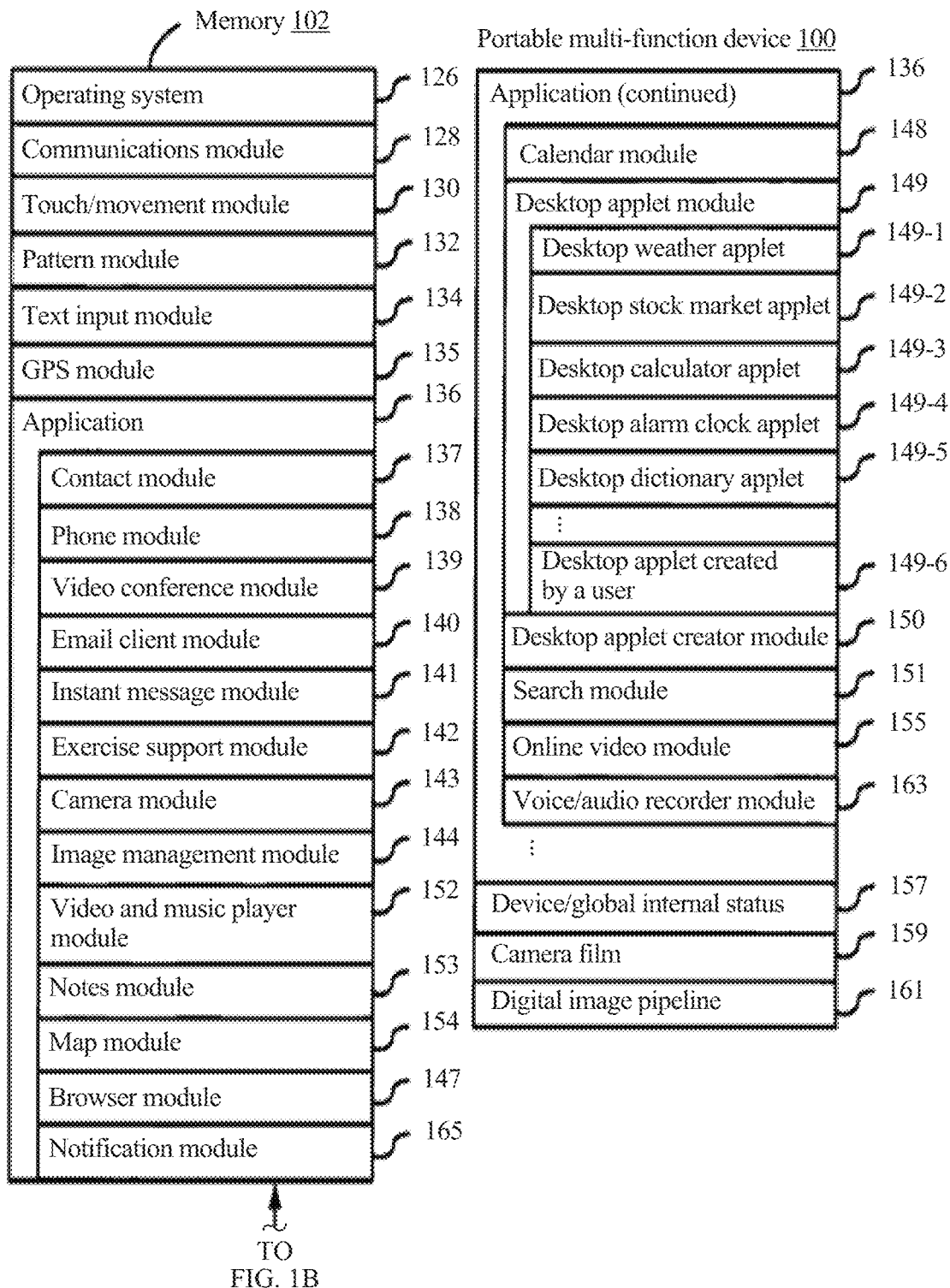
FIG. 1A and FIG. 1B are block diagrams of an electronic device according to some embodiments.

A highly efficient method and interface are usually required for an electronic device to respond to an operation of photographing a document or processing a document by the electronic device. Such a method and an interface can be used to respond to a customized requirement of a user more quickly, efficiently, and intelligently, to increase a success rate of detecting a document edge by the electronic device.

The following described embodiments describe technical solutions for increasing a success rate of detecting a document edge by an electronic device when a photographed document and a background are not very distinct from each other.

It should be understood that multi-color channels in this specification include but are not limited to RGB (Red, Green, Blue) color channels, HSV (Hue, Saturation, Value) color channels, or HSL (Hue, Saturation, Lightness) color channels. It should be noted that an example in which the multi-color channels are the HSV color channels is used for description in this specification. However, this does not constitute a limitation on the present invention. In a specific design, the multi-color channels may alternatively be the RGB color channels, or the HSL color channels, or other types of multi-color channels. The HSV color channels are used as an example. A mathematical expression of multi-color channel data in this specification includes but is not limited to (i, j, s, v), or (i, j, h), (i, j, s), and (i, j, v), where (i, j) are coordinates of a pixel in a color image, and h, s, and v respectively represent values of the pixel with the coordinates (i, j) on a hue color channel, a saturation color channel, and a value color channel. Certainly, the multi-color channel data may alternatively be separately expressed. To be specific, a value of the pixel with the coordinates (i, j) on a single hue channel is (i, j, h), a value of the pixel with the coordinates (i, j) on a single saturation channel is (i, j, s), and a value of the pixel with the coordinates (i, j) on a single value channel is (i, j, v). In other words, the multi-color channel data is expressed as (i, j, h), (i, j, s), and (i, j, v).

It should be understood that the color image may be a preview frame image photographed by the electronic device by using a camera, or may be a digital image stored on the electronic device.

It should be understood that a document may be any planar object that has a rectangular edge, such as a business card, an ID card, or a slideshow projection picture.

FIG. 1A and FIG. 1B, FIG. 2, and FIG. 3A to FIG. 3C provide descriptions of an example device below.

The example device is as follows.

Now reference is made to the embodiments in detail, and examples of the embodiments are shown in the accompanying drawings. Many specific details are provided in the following detailed description, to provide a fill understanding of the present invention. However, it is obvious to a person skilled in the art that the present invention may be practiced without the specific details. In other cases, well-known methods, processes, components, circuits, and networks are not described in detail, so that aspects of the embodiments are easy to understand.

It should be further understood that although the terms such as "first", "second", "third", and "fourth" may be used to describe various elements in this specification, the elements should not be limited by the terms. The terms are merely used to distinguish one element from another element. For example, a first threshold may be named a second threshold, and similarly, a second threshold may be named a first threshold, without departing from the scope of the present invention. Both the first threshold and the second threshold are thresholds. A value of the first threshold and a value of the second threshold may be equal or unequal.

The terms used in the description of the present invention in this specification are merely for the purpose of describing specific embodiments, and are not intended to limit the present invention. The terms "one", "a", and "this" of singular forms used in this specification and the appended claims of the present invention are also intended to include plural forms, unless otherwise specified in the context clearly. It should be further understood that, the term "and/or" used in this specification indicates and includes any or all possible combinations of one or more items in associated listed items. It should be further understood that the term "include" and/or "contain" used in this specification specifies presence of features, integers, steps, operations, elements, and/or components, with presence or addition of one or more other features, integers, steps, operations, elements, components, and/or their combinations not excluded.

According to the context, the term "if" used in this specification may be interpreted as a meaning of "when" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

An electronic device, a user interface configured for such a device, and an embodiment used for an associated process in which such a device is used are described. In some embodiments, the device is a portable communications device, such as a mobile phone, that further includes another function such as a personal digital assistant and/or music player function. An example embodiment of the electronic device includes but is not limited to an electronic device using iOS®, Android®, Microsoft®, or another operating system. Alternatively, another electronic device may be used, such as a laptop computer or a tablet computer having a touch-sensitive surface (for example, a touchscreen display and/or a touchpad). It should be further understood that in some embodiments, the device is not a portable communications device, but a desktop computer that has a touch-sensitive surface (for example, a touchscreen display and/or a touchpad).

An electronic device including a display and a touch-sensitive surface is described in the following discussion. However, it should be understood that the electronic device may include one or more other physical user interface devices such as a physical keyboard, a mouse, and/or a joystick.

The device usually supports various applications such as one or more of the following: a drawing application, a presentation application, a word processing application, a web page creation application, a disk editing application, a spreadsheet application, a game application, a phone application, a video conference application, an email application, an instant message application, an exercise support application, an image management application, a digital camera application, a digital video camera application, a network browsing application, a digital music player application, and/or a digital video player application.

Various applications that can be executed on the device may use at least one common physical user interface device such as a touch-sensitive surface. One or more functions of the touch-sensitive surface and corresponding information displayed on the device may be adjusted and/or changed from an application to a next application and/or may be adjusted and/or changed in a corresponding application. In this way, a common physical architecture (for example, a touch-sensitive surface) of the device may support the various applications by using a user interface that is intuitive and clear to a user.

Figure 1B:
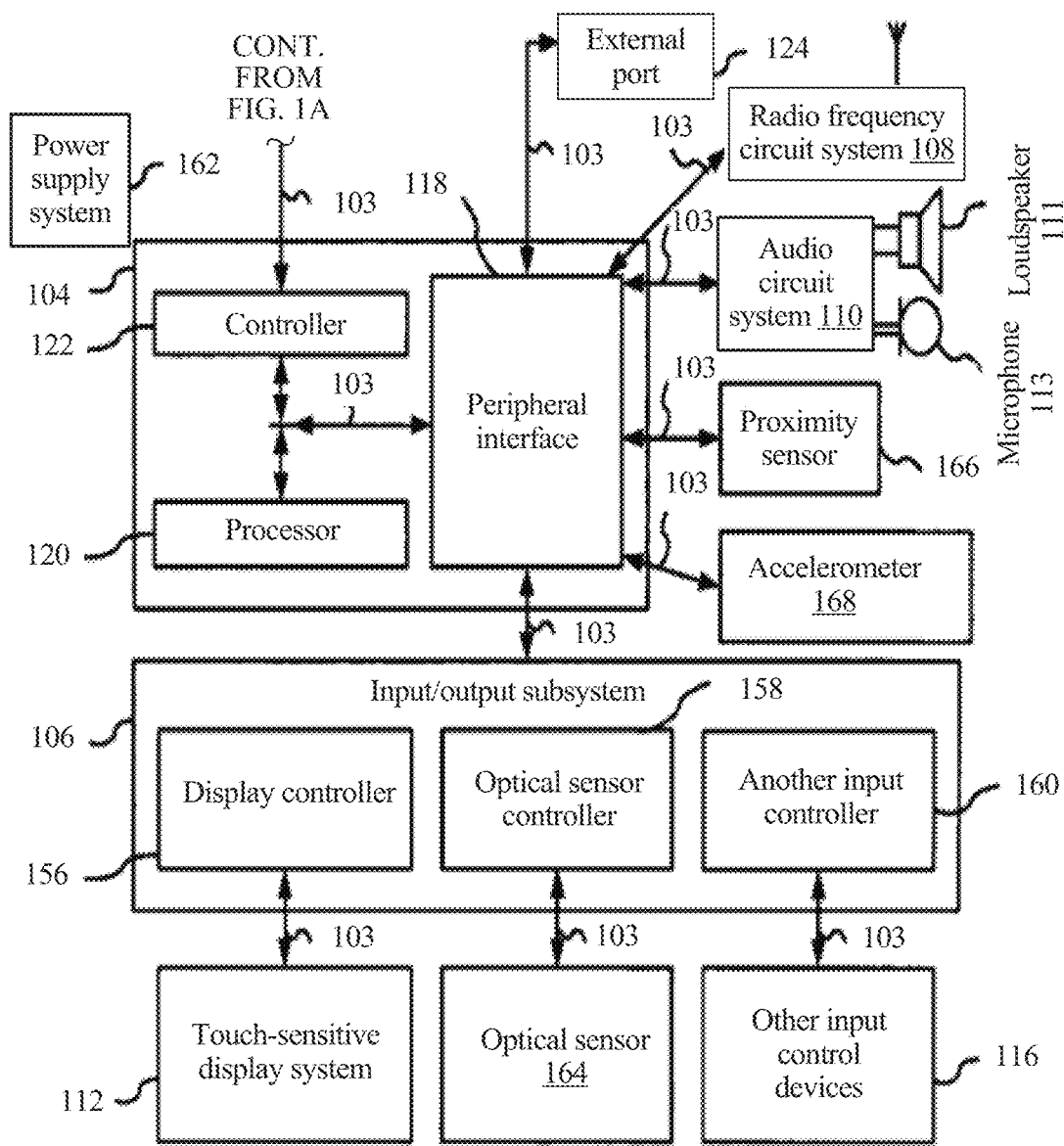

Now an embodiment of a portable device having a touch-sensitive display is focused. FIG. 1A and FIG. 1B are block diagrams of a portable multi-function device 100 having a touch-sensitive display 112 according to some embodiments. The touch-sensitive display 112 is also referred to as a "touchscreen" in some cases for ease of description, or may be referred to as a touch-sensitive display system, or may be referred to as a display system that has a touch-sensitive surface (touch-sensitive surface) and a display screen (display). The portable multi-function device 100 may include a memory 102 (which may include one or more computer readable storage media), a memory controller 122, one or more processing units (CPU) 120, a peripheral interface 118, an RF circuit system 108, an audio circuit system 110, a loudspeaker 111, a microphone 113, an input/output (I/O) subsystem 106, other input control devices 116, and an external port 124. The portable multi-function device 100 may include one or more optical sensors 164. These components may communicate with each other by using one or more communications buses or signal cables 103.

It should be understood that the portable multi-function device 100 is merely an example of an electronic device, and the portable multi-function device 100 may have more or fewer components than those shown, or may have a combination of two or more components, or may have different configurations or arrangements of the components. Various components shown in FIG. 1A and FIG. 1B may be implemented by using hardware, software, or a combination of hardware and software, and include one or more signal processors and/or application-specific integrated circuits.

The memory 102 may include a high-speed random access memory, and may further include a non-volatile memory such as one or more disk storage devices, flash memory devices, or other non-volatile solid state memory devices. The memory controller 122 may control access of other components (for example, the CPU 120 and the peripheral interface 118) of the portable multi-function device 100 to the memory 102.

The peripheral interface 118 may be configured to couple an input and output peripheral of the device to the CPU 120 and the memory 102. The one or more processors 120 run or execute various software programs and/or instruction sets stored in the memory 102 to perform various functions of the portable multi-function device 100 and process data. In some embodiments, the one or more processors 120 include an image signal processor and a dual-core or multi-core processor.

In some embodiments, the peripheral interface 118, the CPU 120, and the memory controller 122 may be implemented on a single chip, for example, a chip 104. In some other embodiments, the peripheral interface 118, the CPU 120, and the memory controller 122 may be implemented on an independent chip.

The RF (radio frequency) circuit system 108 receives and sends an RF signal, and the RF signal is also referred to as an electromagnetic signal. The RF circuit system 108 converts an electrical signal into an electromagnetic signal or converts an electromagnetic signal into an electrical signal, and communicates with a communications network and another communications device by using an electromagnetic signal. The RF circuit system 108 may include a well-known circuit system configured to perform these functions, including but not limited to an antenna system, an RF transceiver, one or more amplifiers, a tuner, one or more oscillators, a digital signal processor, a codec chip set, a subscriber identity module (SIM) card, a memory, and the like. The RF circuit system 108 may communicate with a network and another device through wireless communication. The network is, for example, the Internet (also referred to as World Wide Web (WWW)), at intranet, and/or a wireless network (for example, a cellular phone network, a wireless local area network (LAN), and/or a metropolitan area network (MAN)). The wireless communication may use any type of a plurality of communication standards, communication protocols, and communications technologies, including but not limited to: Global System for Mobile Communications (GSM), Enhanced Data rates for GSM Evolution (EDGE), High Speed Downlink Packet Access (HSDPA), High Speed Uplink Packet Access (HSUPA), Wideband Code Division Multiple Access (WCDMA), Code Division Multiple Access (CDMA), Time Division Multiple Access (TDMA), Bluetooth, Wireless Fidelity (Wi-Fi) (for example, IEEE 802.11a, IEEE 802.11b, IEEE 802.11g, and/or IEEE 802.11n), the Voice over Internet Protocol (VoIP), WiMAX, an email protocol (for example, the Internet Message Access Protocol (IMAP) and/or the Post Office Protocol (POP)), instant messaging (for example, the Extensible Messaging and Presence Protocol (XMPP), SIP for Instant Messaging and Presence Leveraging Extensions (SIMPLE), and an instant message and presence service (IMPS)), and/or short message service (SMS), or any other proper communication protocol, including a communication protocol that has not been developed after this specification is filed.

The audio circuit system 110, the loudspeaker 111, and the microphone 113 provide audio interfaces between a user and the portable multi-function device 100. The audio circuit system 110 receives audio data from the peripheral interface 118, converts the audio data into an electrical signal, and transmits the electrical signal to the loudspeaker 111. The loudspeaker 111 converts the electrical signal into a sound wave that a person can hear. The audio circuit system 110 further receives an electrical signal into which the microphone 113 converts a sound wave. The audio circuit system 110 converts the electrical signal into audio data, and transmits the audio data to the peripheral interface 118 for processing. The audio data may be retrieved from and/or transmitted to the memory 102 and/or the RF circuit system 108 by the peripheral interface 118. In some embodiments, the audio circuit system 110 further includes a headset jack (for example, 212 in FIG. 2). The headset jack provides an interface between the audio circuit system 110 and a removable audio input/output peripheral, and the peripheral is, for example, a headset used only for outputting or a headset used for both outputting (for example, a single-earpiece or double-earpiece headset) and inputting (for example, a microphone).

The I/O subsystem 106 couples input/output peripherals on the portable multi-function device 100, such as the touchscreen 112 and the other input control devices 116, to the peripheral interface 118. The I/O subsystem 106 may include a display controller 156 and one or more input controllers 160 used for the other input control devices. The one or more input controllers 160 receive electrical signals from the other input control devices 116/send electrical signals to the other input control devices 116. The other input control devices 116 may include a physical button (for example, a push button or a rocker button), a dial, a slider switch, a joystick, a click wheel, and the like. In some optional embodiments, the input controller 160 may (or may not) be coupled to any one of a keyboard, an infrared port, a USB port, and a pointer device such as a mouse. The one or more buttons (for example, 208 in FIG. 2) may include an up/down button used for volume control of the loudspeaker 111 and/or the microphone 113. The one or more buttons may include a push button (for example, 206 in FIG. 2).

The touch-sensitive display 112 provides an input interface and an output interface between the device and the user. The display controller 156 receives an electrical signal from the touchscreen 112 and/or sends an electrical signal to the touchscreen 112. The touchscreen 112 displays visual output to the user. The visual output may include a pattern, a text, an icon, a video, and any combination thereof (collectively referred to a pattern). In some embodiments, a part or all of the visual output may be corresponding to user interface objects.

The touchscreen 112 has a touch-sensitive surface, a sensor, or a sensor group that receives input from the user based on a touch sense and/or a touch-sense touch. The touchscreen 112 and the display controller 156 (together with any associated module and/or instruction set in the memory 102) detect a touch (and any movement or interruption of the touch) on the touchscreen 112, and convert the detected touch into interaction with a user interface object (for example, one or more soft keys, icons, web pages, or images) displayed on the touchscreen 112. In an example embodiment, a touch point between the touchscreen 112 and the user is corresponding to a finger of the user.

The touchscreen 112 may use an LCD (liquid crystal display) technology, an LPD (light emitting polymer display) technology, or an LED (light emitting diode) technology, but another display technology may be used in another embodiment. The touchscreen 112 and the display controller 156 may detect a touch and any movement or interruption of the touch by using any one of a plurality of known or to-be-developed touch sensing technologies and another proximity sensor array or another element configured to determine one or more touch points on the touchscreen 112. The plurality of touch sensing technologies include but are not limited to capacitive, resistive, infrared, and surface acoustic wave technologies. In an example embodiment, a projected mutual-capacitance sensing technology is used.

The touchscreen 112 may have video resolution of more than 100 dpi. In some embodiments, the touchscreen has video resolution of approximately 160 dpi. The user may touch the touchscreen 112 by using any appropriate object or accessory, for example, a stylus or a finger. In some embodiments, a user interface is designed to mainly work with a finger-based touch and gesture. In comparison with stylus-based input, accuracy may be lower because a finger has a larger touch area on the touchscreen. In some embodiments, the device interprets rough finger-based input as an accurate pointer/cursor location or command, to perform an action expected by the user.

In some embodiments, in addition to the touchscreen, the portable multi-function device 100 may include a touchpad (not shown) configured to activate or deactivate a specific function. In some embodiments, the touchpad is a touch-sensitive area of the device, the touch-sensitive area is different from the touchscreen, and visual output is not displayed in the touch-sensitive area. The touchpad may be a touch-sensitive surface separated from the touchscreen 112, or may be an extension part of the touch-sensitive surface of the touchscreen.

The portable multi-function device 100 further includes a power supply system 162 configured to supply power to the components. The power supply system 162 may include a power management system, one or more power supplies (for example, a battery or an alternating current (AC)), a recharging system, a power fault detection circuit, a power converter or inverter, a power status indicator (for example, a light emitting diode (LED)), and any other component associated with power generation, management, and allocation in the portable device.

The portable multi-function device 100 may further include the one or more optical sensors 164. FIG. 1B shows an optical sensor coupled to an optical sensor controller 158 in the I/O subsystem 106. The optical sensor 164 may include a charge coupled device (CCD) or a complementary metal-oxide-semiconductor (CMOS) phototransistor. The optical sensor 164 receives, from an environment, light projected by one or more lenses, and converts the light into data representing an image. In combination with an imaging module 143 (also referred to as a camera module), the optical sensor 164 may capture a static image or a video. In some embodiments, one or more optical sensors are located in the rear of the portable multi-function device 100, and are opposite to the touchscreen display 112 in the front of the device, so that the touchscreen display can be used as a viewfinder for collecting a static image and/or a video image. In some embodiments, one or more additional optical sensors are located in the front of the device, so that the user can obtain an image of another video conference participant for a video conference while viewing the user on the touchscreen display.

The portable multi-function device 100 may further include one or more proximity sensors 166. FIG. 1B shows a proximity sensor 166 coupled to the peripheral interface 118. Alternatively, the proximity sensor 166 may be coupled to the input controller 160 in the I/O subsystem 106. In some embodiments, when the electronic device is placed near an ear of the user (for example, when the user is making a call), the proximity sensor turns off and disables the touchscreen 112.

The portable multi-function device 100 may further include one or more accelerometers 168. FIG. 1B shows an accelerometer 168 coupled to the peripheral interface 118. Alternatively, the accelerometer 168 may be coupled to the input controller 160 in the I/O subsystem 106. In some embodiments, based on an analysis of data received from the one or more accelerometers, information is displayed on the touchscreen display as a portrait mode view or a landscape mode view. Optionally, in addition to the accelerometer 168, the portable multi-function device 100 further includes a magnetometer (not shown) and a GPS (or GLONASS, BeiDou, or another global navigation system) receiver (not shown), configured to obtain information about a location and an orientation (for example, a portrait orientation or a landscape orientation) of the portable multi-function device 100.

In some embodiments, software components stored in the memory 102 include an operating system 126, a communications module (or instruction set) 128, a touch/movement module (or instruction set) 130, a pattern module (or instruction set) 132, a text input module (or instruction set) 134, a Global Positioning System (GPS) module (or instruction set) 135, and an application (or instruction set) 136. In addition, in some embodiments, the memory 102 stores a device/global internal status 157, as shown in FIG. 1A. The device/global internal status 157 includes one or more of the following: an active application status used to indicate a currently active application (if there is any); a display status used to indicate an application, a view, or other information that occupies each area of the touchscreen display 112; a sensor status including information obtained from each sensor and the input control device 116 of the device; and location information about a location and a posture of the device.

The operating system 126 (for example, Darwin, RTXC, Linux, Unix, OS X, Windows, Android, or another embedded operating system (for example, VxWorks)) includes various software components and/or drives used to control and manage general system tasks (for example, memory management, storage device control, and power management), and is conducive to communication between hardware and software components. In addition, in some embodiments, the memory 102 stores a digital camera film 159 and a digital image pipeline 161.

The communications module 128 facilitates communication with another device by using one or more external ports 124, and further includes various software components used for processing data received by the RF circuit system 108 and/or the external port 124. The external port 124 (for example, a Universal Serial Bus (USB) or a live line) is suitable to be directly coupled to another device or indirectly coupled to another device by using a network (for example, the Internet or a wireless LAN). In some embodiments, the external port is a multi-pin (for example, 30-pin) connector that is the same as or similar to a 30-pin connector used on an iPod (a trademark of Apple Inc.) device and/or compatible with the 30-pin connector used on the iPod device.

The touch/movement module 130 may detect a touch on the touchscreen 112 (in combination with the display controller 156) and another touch-sensitive device (for example, a touchpad or a physical click wheel). The touch/movement module 130 includes a plurality of software components configured to perform various operations related to touch detection, for example, to determine whether a touch has occurred (for example, detect a finger pushing event), to determine whether the touch moves and track this movement on an entire touch-sensitive surface (for example, detect one or more finger drag events), and to determine whether the touch has ended (for example, detect a finger release event or touch interruption). The touch/movement module 130 receives touch data from the touch-sensitive surface. Determining movement of a touch point may include determining a speed (value), a velocity (value and direction), and/or acceleration (change of the value and/or the direction) of the touch point, and the movement of the touch point is indicated by a series of touch data. These operations may be applied to a single-point touch (for example, a single-finger touch) or a multi-point simultaneous touch (for example, a "multi-point touch"/a multi-finger touch). In some embodiments, the touch/movement module 130 and the display controller 156 detect a touch on the touchpad.

The touch/movement module 130 may detect gesture input of the user. Different gestures on the touch-sensitive surface cause different touch patterns. Therefore, a gesture may be detected by detecting a specific touch pattern. For example, detecting a single-finger tap gesture includes detecting a finger pushing event and then detecting a finger release (release) event at a same location (or a basically same location) (for example, at an icon location) as the finger pushing event. For another example, detecting a finger flick gesture on the touch-sensitive surface includes detecting a finger pushing event, then detecting one or more finger drag events, and subsequently detecting a finger release (release) event.

The pattern module 132 includes a plurality of known software components configured to render and display a pattern on the touchscreen 112 or another display, including a component configured to change intensity of the displayed pattern. As used in this specification, a term "pattern" includes any object that can be displayed to the user, and includes but is not limited to a text, a web page, an icon (for example, a user interface object including a soft key), a digital image, a video, an animation, and the like.

In some embodiments, the pattern module 132 stores to-be-used data to represent a pattern. A corresponding code may be allocated to each pattern. The pattern module 132 receives, from an application or the like, one or more codes of a pattern that is specified for display, further receives coordinate data and other pattern attribute data if necessary, and then generates screen image data and outputs the screen image data to the display controller 156.

The text input module 134 that may be used as a component of the pattern module 132 provides a soft keyboard for entering a text in a plurality of applications (for example, a contact 137, an email 140, an instant message 141, a browser 147, and any other application requiring text input).

The GPS module 135 determines a location of the device, and provides the information for use in various applications (for example, the GPS module 135 provides the information for a phone 138 for location-based dialing, provides the information for a camera 143 as picture/video metadata, and provides the information for a location-based service application such as a desktop weather applet, a desktop local yellow page applet, and a desktop map/navigation applet).

The application 136 may include the following modules (or instruction sets), or a subset or a superset of the following modules:
- the contact module 137 (also referred to as an address book or a contact list in some cases);
- the phone module 138;
- a video conference module 139;
- the email client module 140;
- the instant message (IM) module 141;
- an exercise support module 142;
- the camera module 143 for a static image and/or a video image;
- an image management module 144;
- the browser module 147;
- a calendar module 148;
- a desktop applet module 149, where the desktop applet module 149 may include one or more of the following: a desktop weather applet 149-1, a desktop stock market applet 149-2, a desktop calculator applet 149-3, a desktop alarm clock applet 149-4, a desktop dictionary applet 149-5, another desktop applet obtained by the user, and a desktop applet 149-6 created by the user;
- a desktop applet creator module 150 configured to generate the desktop applet 149-6 created by the user;
- a search module 151;
- a video and music player module 152, where the video and music player module 152 may include a video player module and a music player module;
- a notes module 153;
- a map module 154;
- an online video module 155;
- a voice/audio recorder module 163; and/or
- a notification module 165.

Other examples of the application 136 that can be stored in the memory 102 include another word processing application, another image editing application, a drawing application, a presentation application, an application enabled by Java, an encryption, a digital right management, a voice recognition, and a voice replication.

In combination with the touchscreen 112, the display controller 156, the touch module 130, the pattern module 132, and the text input module 134, the contact module 137 may be configured to manage an address book or a contact list (for example, the contact module 137 stores the address book or the contact list in an application internal status 192 of the contact module 137 in the memory 102 or a memory 370). Managing the address book or the contact list includes adding a name to the address book; deleting a name from the address book; associating a phone number, an email address, an actual address, or other information with a name; associating an image with a name; classifying names; providing a phone number or an email address to initiate and/or facilitate communication by using the phone 138, the video conference 139, the email 140, or the IM 141; and the like.

In combination with the RF circuit system 108, the audio circuit system 110, the loudspeaker 111, the microphone 113, the touchscreen 112, the display controller 156, the touch module 130, the pattern module 132, and the text input module 134, the phone module 138 may be configured to: enter a character sequence corresponding to a phone number, access one or more phone numbers in the address book 137, change an entered phone number, dial a corresponding phone number, make a call, and hang up when the call is completed. As described above, wireless communication may use any one of a plurality of communication standards, communication protocols, and communications technologies.

In combination with the RF circuit system 108, the audio circuit system 110, the loudspeaker 111, the microphone 113, the touchscreen 112, the display controller 156, the optical sensor 164, the optical sensor controller 158, the touch module 130, the pattern module 132, the text input module 134, the contact list 137, and the phone module 138, the video conference module 139 includes executable instructions used to initiate, perform, and end a video conference between the user and one or more other participants according to a user instruction.

In combination with the RF circuit system 108, the touchscreen 112, the display controller 156, the touch module 130, the pattern module 132, and the text input module 134, the email client module 140 includes executable instructions used to create, send, receive, and manage an email in response to a user instruction. In combination with the image management module 144, the email client module 140 makes it very easy to create and send an email with a static image or a video image photographed by the camera module 143.

In combination with the RF circuit system 108, the touchscreen 112, the display controller 156, the touch module 130, the pattern module 132, and the text input module 134, the instant message module 141 includes executable instructions used to enter a character sequence corresponding to an instant message, change a previously entered character, transmit a corresponding instant message (for example, transmit a phone-based instant message by using the short message service (SMS) or multimedia messaging service (MMS) protocol, or an Internet-based instant message by using the XMPP, the SIMPLE, or an IMPS), receive an instant message, and view the received instant message. In some embodiments, the transmitted and/or received instant message may include a pattern, a photo, an audio file, a video file, and/or another attachment supported in an MMS and/or an enhanced messaging service (EMS). As used in this specification, the "instant message" includes both a phone-based message (for example, a message sent by using the SMS or the MMS) and an Internet-based message (for example, a message sent by using the XMPP, the SIMPLE, or the IMPS).

In combination with the RF circuit system 108, the touchscreen 112, the display controller 156, the touch module 130, the pattern module 132, the text input module 134, the GPS module 135, the map module 154, and a music player module 146, the exercise support module 142 includes executable instructions used to: create exercise (for example, exercise with time, a distance, and/or a calorie consumption target); communicate with an exercise sensor (sports device); receive data from the exercise sensor; calibrate a sensor configured to monitor exercise; select and play music for exercise; and display, store, and transmit exercise data.

In combination with the touchscreen 112, the display controller 156, the optical sensor 164, the optical sensor controller 158, the touch module 130, the pattern module 132, the digital image pipeline 161 (which converts original data from the optical sensor into a final image or video), and the image management module 144, the camera module 143 includes executable instructions used to capture a static image or a video (including a video stream), store the static image or the video in the memory 102 (for example, in the digital camera film 159), change a feature of a static image or a video, or delete a static image or a video from the memory 102 (for example, from the digital camera film 159).

In combination with the touchscreen 112, the display controller 156, the touch module 130, the pattern module 132, the text input module 134, and the camera module 143, the image management module 144 includes executable instructions used to: arrange, change (for example, edit), or control, tag, delete, and present (for example, in a digital slideshow or an album) in another manner, and store a static image and/or a video image (including a static image and/or a video image stored in the camera film 159).

In combination with the RF circuit system 108, the touchscreen 112, the display system controller 156, the touch module 130, the pattern module 132, and the text input module 134, the browser module 147 includes executable instructions used to browse the Internet (including searching, linking to, receiving, and displaying a web page or a part of the web page; and linking to a web page attachment and another file) according to a user instruction.

In combination with the RF circuit system 108, the touchscreen 112, the display system controller 156, the touch module 130, the pattern module 132, the text input module 134, the email client module 140, and the browser module 147, the calendar module 148 includes executable instructions used to create, display, change, and store a calendar and calendar-related data (for example, a calendar entry and a to-be-done task list) according to a user instruction.

In combination with the RF circuit system 108, the touchscreen 112, the display system controller 156, the touch module 130, the pattern module 132, the text input module 134, and the browser module 147, the desktop applet module 149 is a micro application (for example, the desktop weather applet 149-1, the desktop stock market applet 149-2, the desktop calculator applet 149-3, the desktop alarm clock applet 149-4, and the desktop dictionary applet 149-5) downloaded and used by the user, or a micro application (for example, the desktop applet 149-6 created by the user) created by the user. In some embodiments, a desktop applet includes an HTML (Hypertext Markup Language) file, a CSS (cascading style sheet) file, and a JavaScript file. In some embodiments, a desktop applet includes an XML (Extensible Markup Language) file and a JavaScript file (for example, a desktop applet of Yahoo!).

In combination with the RF circuit system 108, the touchscreen 112, the display system controller 156, the touch module 130, the pattern module 132, the text input module 134, and the browser module 147, the desktop applet creator module 150 may be used by the user to create a desktop applet (for example, to transfer a user-specified part of a web page to the desktop applet).

In combination with the touchscreen 112, the display system controller 156, the touch module 130, the pattern module 132, and the text input module 134, the search module 151 includes executable instructions used to search, according to a user instruction, the memory 102 for a text, music, a voice, an image, a video, and/or another file that match/matches one or more search standards (for example, one or more search words specified by the user).

In combination with the touchscreen 112, the display system controller 156, the touch module 130, the pattern module 132, the audio circuit system 110, the loudspeaker 111, the RF circuit system 108, and the browser module 147, the video and music player module 152 includes executable instructions that allow the user to download and play back recorded music and another recorded voice file that are stored in one or more file formats (for example, an MP3 or AAC file), and executable instructions used to display, present, or play back a video in another manner (for example, on the touchscreen 112 or on an external display connected to the external port 124). In some embodiments, the device 100 may include functionality of an MP3 player.

In combination with the touchscreen 112, the display controller 156, the touch module 130, the pattern module 132, and the text input module 134, the notes module 153 includes executable instructions used to create and manage a note, a to-be-done task list, and the like according to a user instruction.

In combination with the RF circuit system 108, the touchscreen 112, the display system controller 156, the touch module 130, the pattern module 132, the text input module 134, the GPS module 135, and the browser module 147, the map module 154 may be configured to receive, display, change, and store a map and map-related data (for example, a driving route; data of a shop or another point of interest at or near a specific location; and other location-based data) according to a user instruction.

In combination with the touchscreen 112, the display system controller 156, the touch module 130, the pattern module 132, the audio circuit system 110, the loudspeaker 111, the RF circuit system 108, the text input module 134, the entail client module 140, and the browser module 147, the online video module 155 includes instructions that allow the user to access, browse, receive (for example, receive and/or download in a streaming manner), play back (for example, on the touchscreen or on an external display connected to the external port 124), send an email with a link to a specific online video, and manage, in another manner, online videos in one or more file formats (for example, H.264). In some embodiments, a link to a specific online video is sent by using the instant message module 141 other than the email client module 140.

In combination with the touchscreen 112, the display system controller 156, the touch module 130, the pattern module 132, the audio circuit system 110, the loudspeaker 111, and the microphone 113, the voice/audio recorder module 163 includes executable instructions that allow the user to record audio (for example, a voice) in one or more file formats (for example, an MP3 or AAC file), and executable instructions used to present or play back a recorded audio file in another manner.

In combination with the touchscreen 112, the display system controller 156, the touch module 130, and the pattern module 132, the notification module 165 includes executable instructions used to display a notification or an alarm (for example, an incoming message or an incoming call, a calendar event reminder, or an application event) on the touchscreen 112.

Each of the foregoing modules and applications is corresponding to a set of executable instructions used to perform one or more of the foregoing functions and methods described in this application (for example, the computer-implemented method and another information processing method described in this specification). These modules (namely, instruction sets) are not necessarily implemented as separate software programs, processes, or modules. Therefore, various subsets of these modules may be combined or rearranged in another manner in various embodiments. In some embodiments, the memory 102 may store a subset of the foregoing modules and data structures. In addition, the memory 102 may store another module and another data structure that are not described above.

In some embodiments, the portable multi-function device 100 is a device on which operations of a set of predefined functions are performed by using only a touchscreen and/or a touchpad. The touchscreen and/or the touchpad serve/serves as main input control devices or a main input control device configured to operate the portable multi-function device 100, so that a quantity of physical input control devices (for example, push buttons or dials) on the portable multi-function device 100 can be reduced.

The set of predefined functions that may be performed by using only the touchscreen and/or the touchpad includes navigation between user interfaces. In some embodiments, when the touchpad is touched by the user, the portable multi-function device 100 is navigated to a main menu or a root menu from any user interface that may be displayed on the portable multi-function device 100. In such embodiments, the touchpad may be referred to as a "menu button". In some other embodiments, the menu button may be a physical push button or another physical input control device other than the touchpad.

Figure 2:
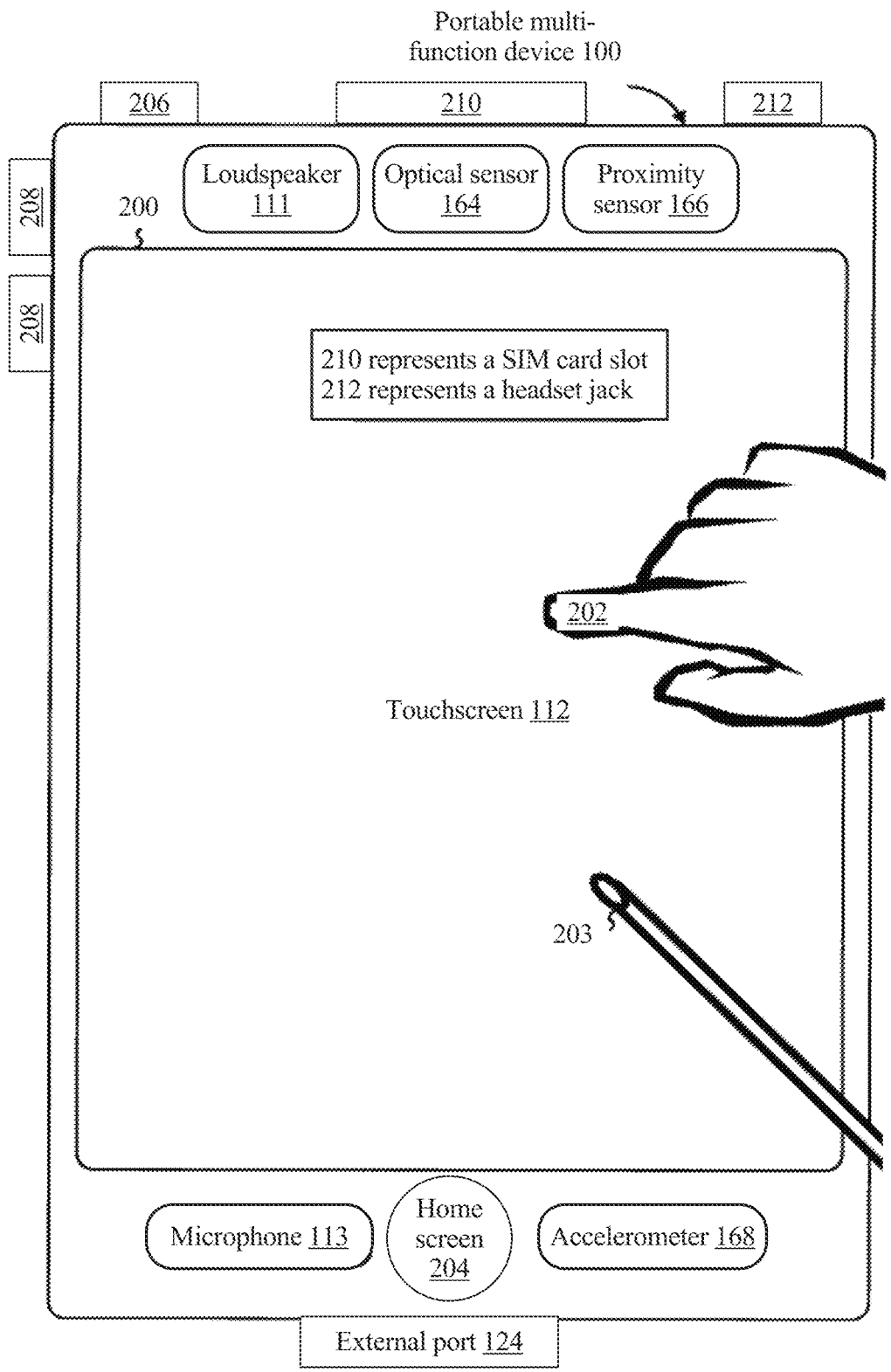
FIG. 2 shows an electronic device according to some embodiments.

FIG. 2 shows a portable multi-function device 100 having a touchscreen 112 according to some embodiments. The touchscreen may display one or more patterns on a user interface (UI) 200. In this embodiment and other embodiments described below, a user may select one or more of these patterns by making a gesture on the patterns, for example, by using one or more fingers 202 (not drawn to scale in the accompanying drawings) or one or more styluses 203 (not drawn to scale in the accompanying drawings). In some embodiments, one or more patterns are selected when the user interrupts a touch on the one or more patterns. In some embodiments, the gesture may include one or more taps, one or more slides (from left to right, from right to left, upwards, and/or downwards), and/or drag of a finger that is touching the portable multi-function device 100 (from right to left, from left to right, upwards, and/or downwards). In some embodiments, a pattern is not selected when the pattern is unintentionally touched. For example, when a gesture corresponding to selection is a tap, a corresponding application is not selected when a flick gesture is performed on an application icon.

The portable multi-function device 100 may further include one or more physical buttons such as a "home screen" or a menu button 204. As described above, the menu button 204 may be used for navigation to any application 136 in a set of applications that may run on the device 100. Alternatively, in some embodiments, the menu button is implemented as a soft key displayed on a GUI on the touchscreen 112.

In an embodiment, the portable multi-function device 100 includes the touchscreen 112, the menu button 204, a push button 206 configured to power on/off and lock the device, (one or more) volume adjustment buttons 208, a subscriber identity module (SIM) card slot 210, a headset jack 212, and an interconnection/charging external port 124. The push button 206 may be configured to: power on/off the device by pushing the button and keeping the button in a pushed state for predefined duration; lock the device by pushing the button and releasing the button in time shorter than the predefined duration; and/or unlock the device or initiate an unlocking process. In an optional embodiment, the portable multi-function device 100 may further receive, by using a microphone 113, voice input used to activate or deactivate some functions.

Figure 3A:
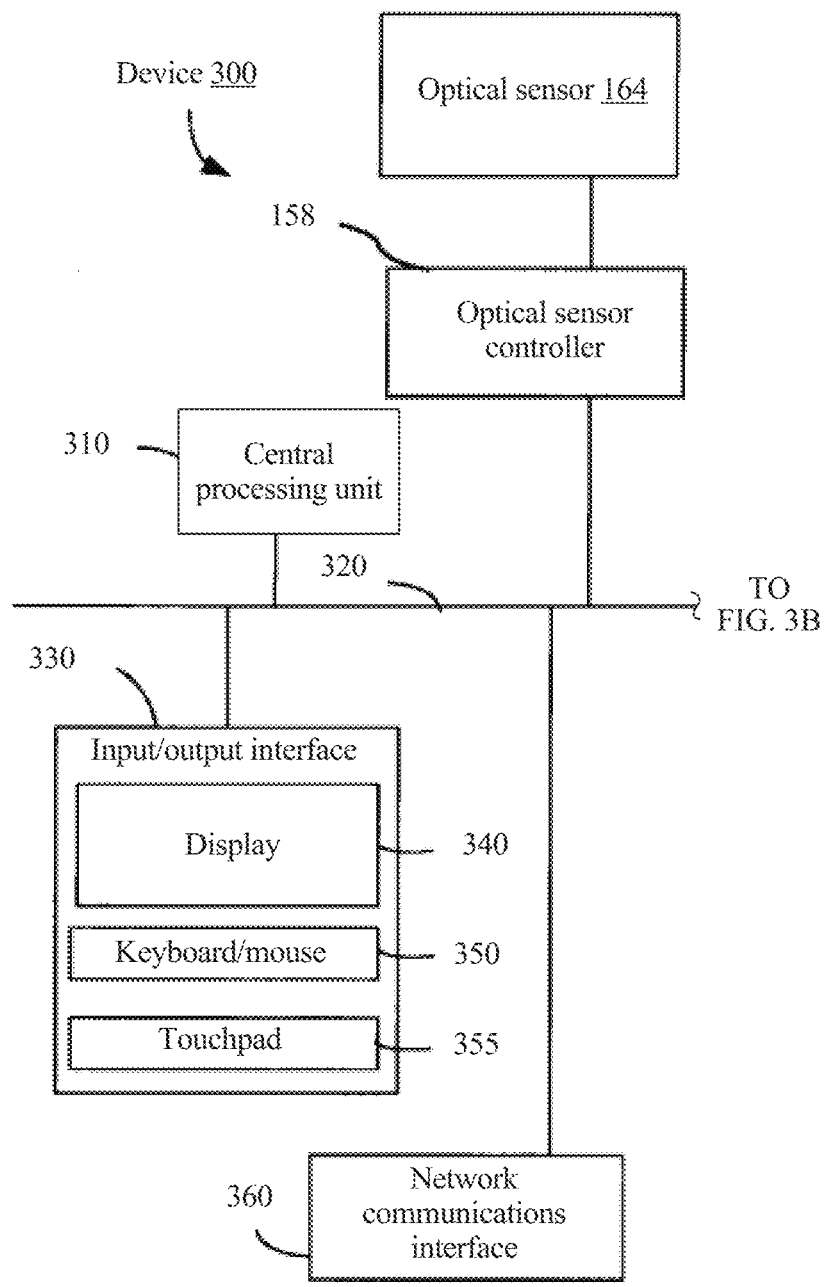
Figure 3B:
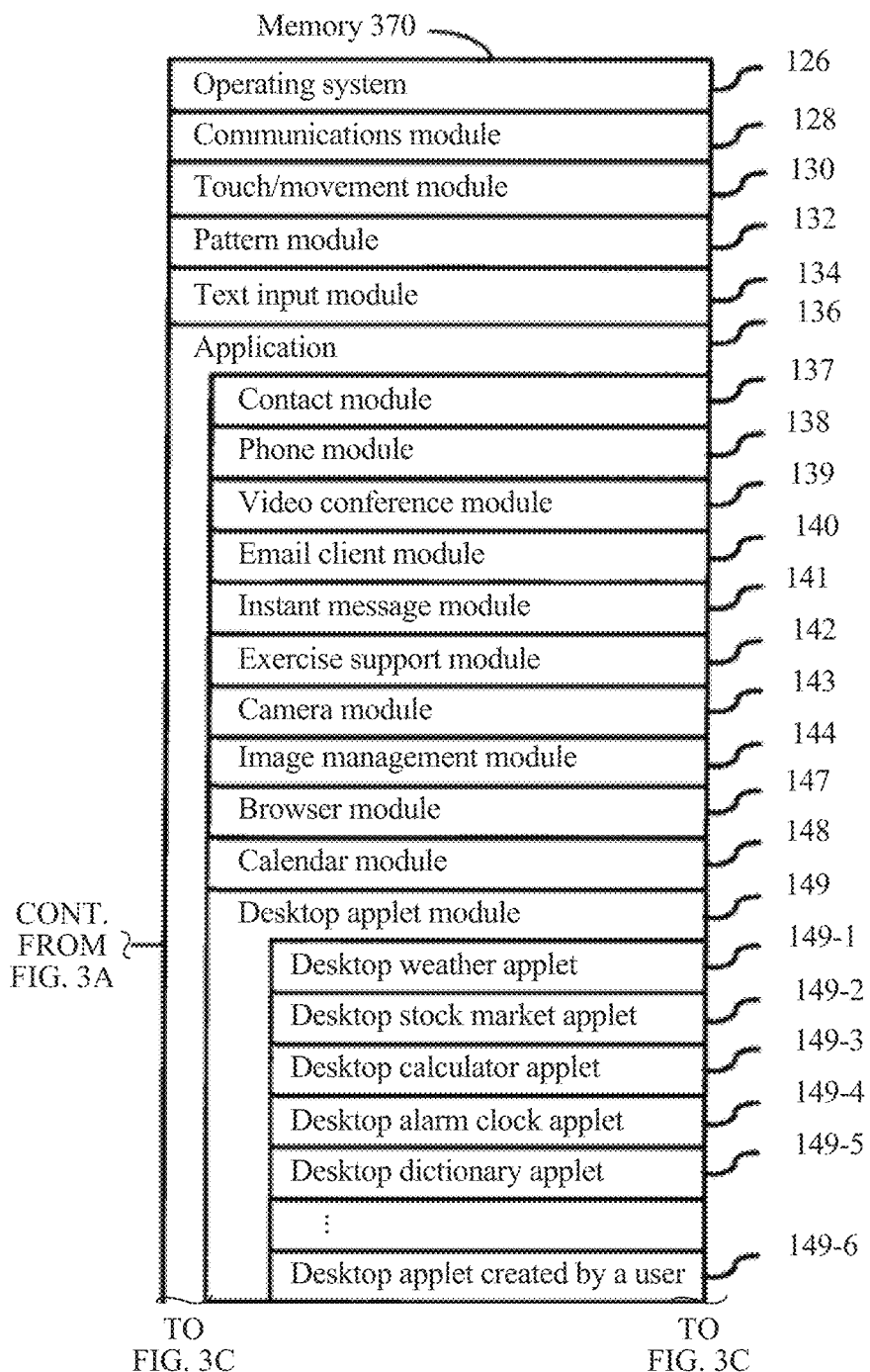

FIG. 3A to FIG. 3C are a block diagram of an example device having a display and a touch-sensitive surface according to some embodiments. A device 300 is not necessarily portable. In some embodiments, the device 300 is a laptop computer, a desktop computer, a tablet computer, a multimedia player device, a navigation device, an education device (for example, a learning toy for children), a game system, or a control device (for example, a household or industrial controller). The device 300 generally includes one or more processing units (CPU) 310, one or more network communications interfaces 360 or one or more other communications interfaces 360, a memory 370, and one or more communications buses 320 configured to interconnect these components. In some embodiments, the processing unit 310 includes an image signal processor and a dual-core or multi-core processor. The communications bus 320 may include a circuit system (referred to as a chip set in some cases) configured to interconnect system components and control communication between the system components. The device 300 includes an input/output (I/O) interface 330 with a display 340, and the display 340 is usually a touchscreen display. The I/O interface 330 may further include a keyboard and/or a mouse (or another pointer device) 350 and a touchpad 355. The device 300 further includes an optical sensor 164 and an optical sensor controller 158. The memory 370 includes a high-speed random access memory such as a DRAM, an SRAM, a DDR RAM, or another random access solid state memory device; and may include a non-volatile memory such as one or more disk storage devices, compact disc storage devices, flash memory devices, or other non-volatile solid state storage devices. Optionally, the memory 370 may include one or more storage devices disposed away from the CPU 310. In some embodiments, the memory 370 stores a program, a module, and a data structure that are similar to a program, a module, and a data structure that are stored in the memory 102 of the electronic device 100 (FIG. 1A), or a subset thereof. In addition, the memory 370 may store another program, another module, and another data structure that are not in the memory 102 of the electronic device 100. For example, the memory 370 of the device 300 may store a drawing module 380, a presentation module 382, a word processing module 384, a web page creation module 386, a disk editing module 388, and/or a spreadsheet module 390. However, the memory 102 of the electronic device 100 (FIG. 1A) may not store these modules.

Each of the foregoing identified elements in FIG. 3A to FIG. 3C may be stored in one or more memory devices described above. Each of the foregoing identified modules is corresponding to a set of instructions used to perform the foregoing functions. The foregoing identified modules or programs (namely, instruction sets) are not necessarily implemented as separate software programs, processes, or modules. Therefore, various subsets of these modules may be combined or rearranged in another manner in various embodiments. In some embodiments, the memory 370 may store a subset of the foregoing modules and data structures. In addition, the memory 370 may store another module and another data structure that are not described above.

It should be noted that electronic devices in this specification include the portable multi-function device 100 in FIG. 1A and FIG. 1B, and FIG. 2, and the device 300 in FIG. 3A to FIG. 3C.

Now turn attention to an embodiment of detecting a document edge that may be implemented on the electronic device (for example, the device 300 or the electronic device 100).

Figure 4A:
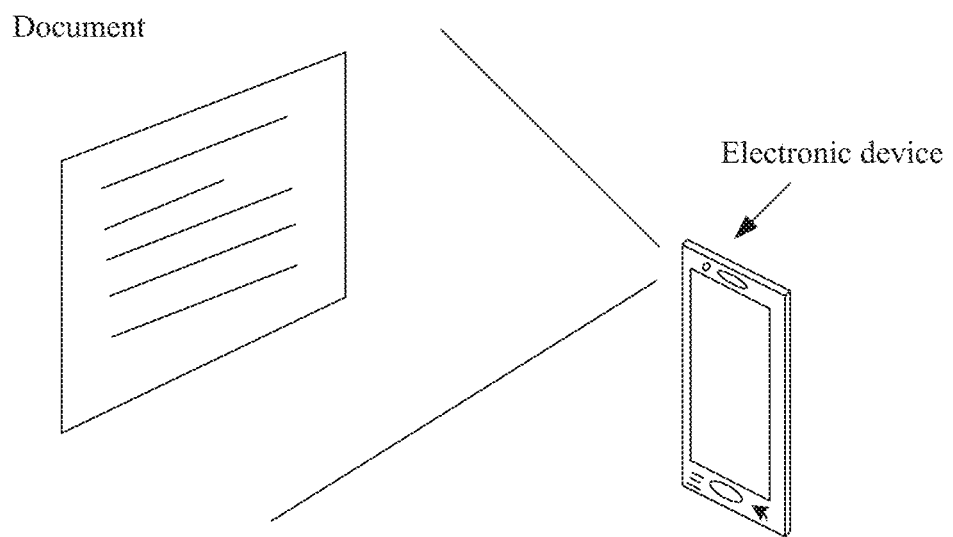
FIG. 4a is a schematic diagram in which an electronic device invokes a photographing apparatus to photograph a document according to some embodiments.
Figure 4B:
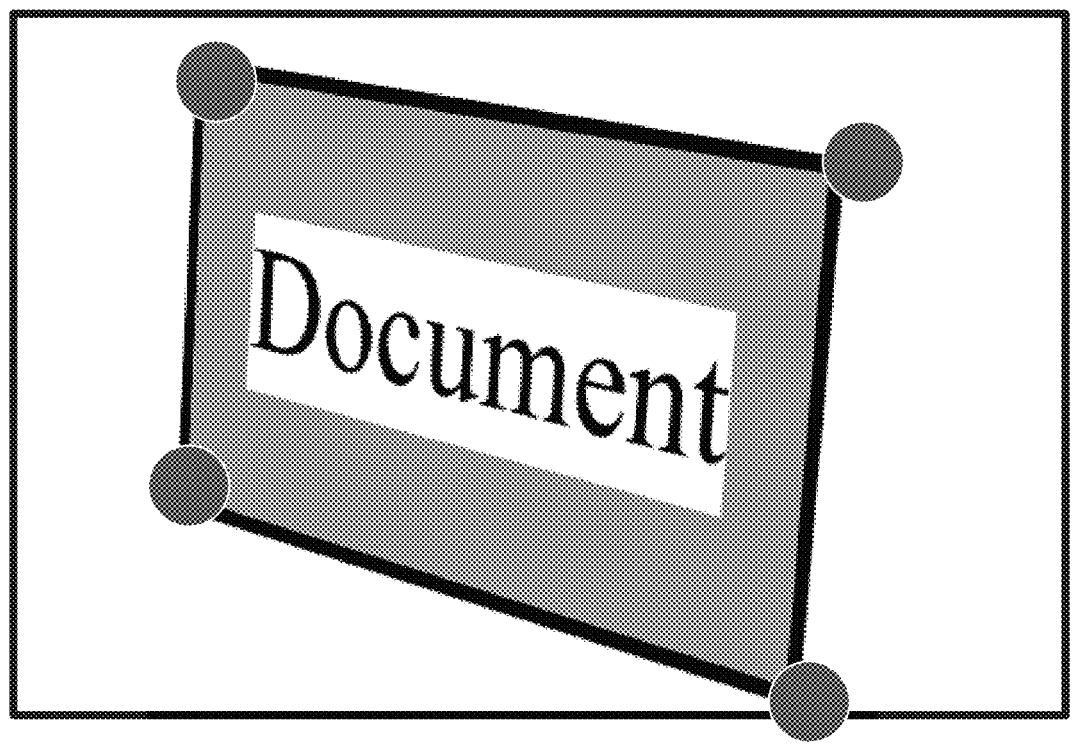
FIG. 4b is a schematic diagram of a quadrilateral area in which a source rectangle picture is located in an image photographed by an electronic device according to some embodiments.

FIG. 4a and FIG. 4b are schematic diagrams of an application scenario of an electronic device.

As shown in FIG. 4a, the electronic device invokes a photographing apparatus to photograph a document. A size of a picture photographed by the photographing apparatus is usually greater than that of a source rectangle picture such as the document, and there is a specific tilt angle. A unit inside the electronic device processes the photographed picture in real time, and outputs, in an ordered coordinate form, a quadrilateral formed by four vertices of the source rectangle picture of interest.

FIG. 4b shows an example of a quadrilateral area in which a source rectangle picture is located in a photographed image. The vertices of the quadrilateral in which the source rectangle picture is located are marked by using circles, the quadrilateral occupies only a part of the photographed picture, and there is a tilt. The following describes the technical solutions by using an example in which the foregoing photographed image is used as input and a quadrilateral formed by four detected vertices is used as output.

Figure 5:
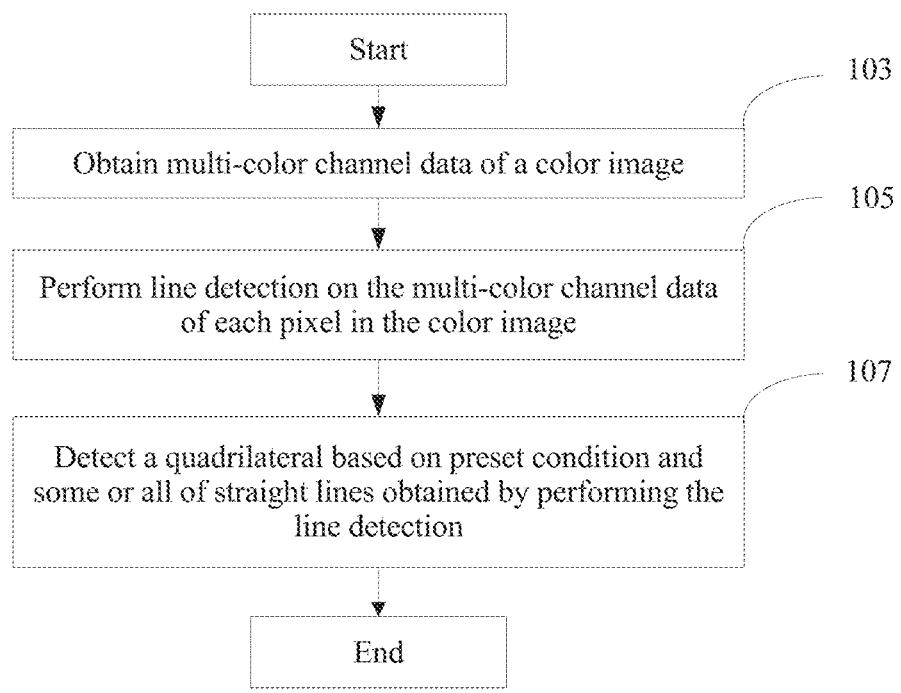
FIG. 5 is a flowchart of document edge detection according to some embodiments.

FIG. 5 shows a document edge detection procedure or algorithm according to some embodiments.

103. An electronic device obtains multi-color channel data of each pixel in a color image, where the multi-color channel data includes two-dimensional coordinate values of the pixel and a value of the pixel on each color channel.

105. The electronic device performs line detection on the multi-color channel data of each pixel in the color image.

107. The electronic device detects a quadrilateral based on preset condition and some or all of straight lines obtained by performing the line detection, where the preset condition include that a value of an included angle between opposite sides of the quadrilateral is less than a first threshold, a value of an included angle between adjacent sides of the quadrilateral falls within a preset angle value domain, and a distance between the opposite sides of the quadrilateral is greater than a second threshold, where the first threshold is an integer greater than zero, and the second threshold is an integer greater than zero.

Optionally, the preset condition further include that a ratio of a quantity of actually detected edge pixels to a circumference of the quadrilateral is maximum.

Figure 6:
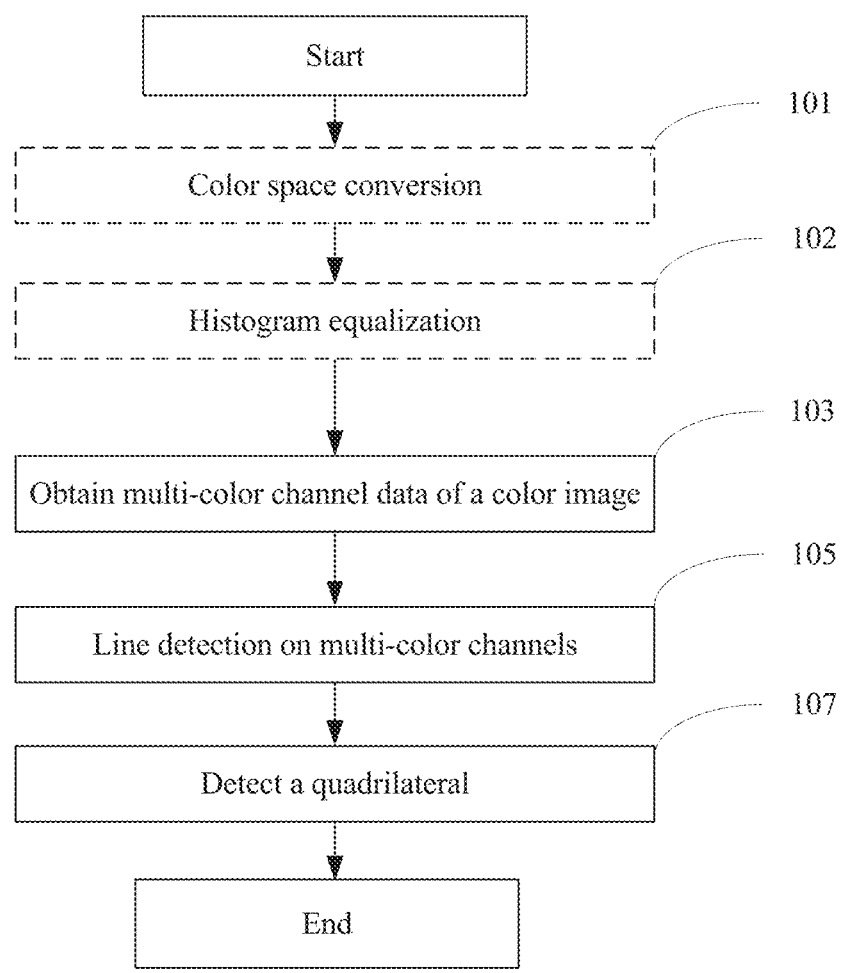
FIG. 6 is a flowchart of document edge detection according to some embodiments.

Based on FIG. 5, optionally, FIG. 6 includes two more optional steps 101 and 102 compared with FIGS. 5. 101 and 102 may be separately selected, or both 101 and 102 may be selected.

101. The electronic device performs color space conversion on an input color image.

102. The electronic device performs histogram equalization on a to-be-processed color image.

Figure 7:
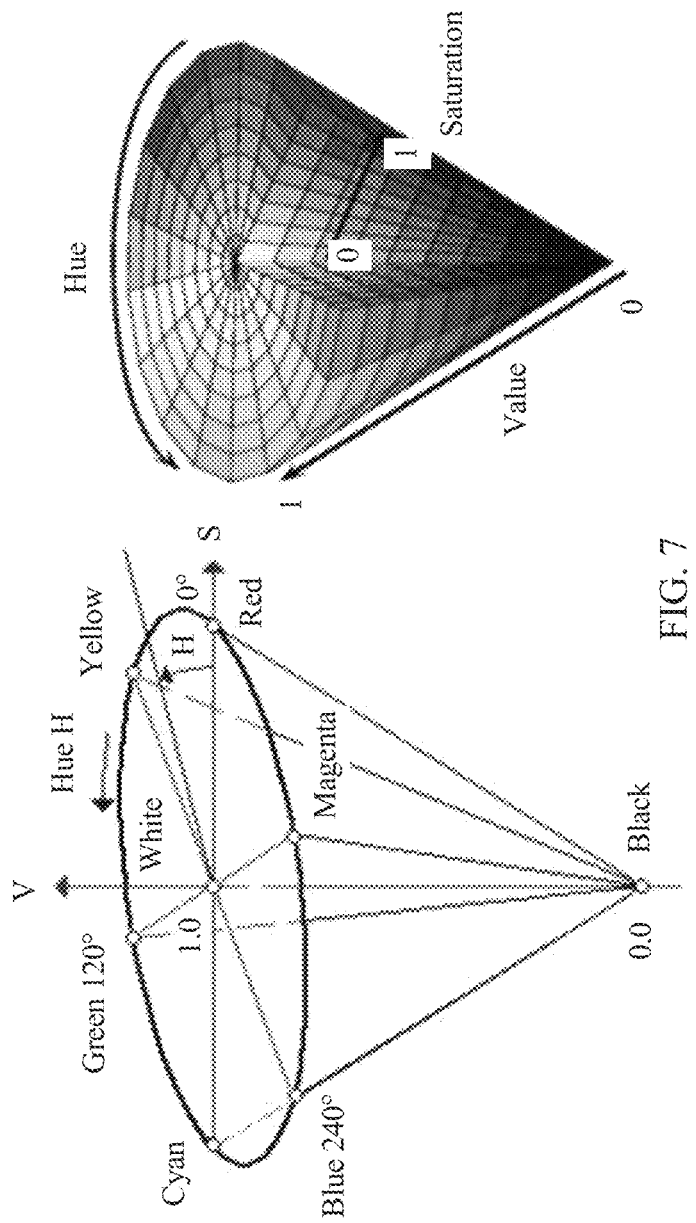
FIG. 7 is a schematic diagram of conversion from an RGB color space into an HSV color space.

For a schematic diagram of step 101 of performing color space conversion on an input color image, refer to FIG. 7, FIG. 7 is a schematic diagram of conversion from an RGB color space into an HSV color space. It is assumed below that the input color image in step 101 may be an image captured by a photographing apparatus of the electronic device, or may be an image stored on the electronic device, or may be a color image on which histogram equalization is to be performed. In addition, it is assumed that the input color image in step 101 includes RGB color channels. However, HSV color channels best meet a human visual principle, and detecting a document edge by using the HSV channels meets consistency between a sense of human eyes and a document edge detection algorithm. In other words, the document edge detection algorithm can be used to detect edge information perceived by the human eyes. Herein, the RGB color channels may be converted into the HSV color channels by using a color space conversion algorithm. A specific process is as follows, where R, G and B respectively represent red, green, and blue color channel information of the RGB color channels, and H, S, and V respectively represent hue, saturation, and value color channel information of the HSV color channels.

$$\max=\max(R,G,B) \quad (1)$$

$$\min=\min(R,G,B) \quad (2)$$

$$\text{if } R=\max, H=(G-B)/(\max-\min) \quad (3)$$

$$\text{if } G=\max, H=2+(B-R)/(\max-\min) \quad (4)$$

$$\text{if } B=\max, H=4+(R-G)/(\max-\min) \quad (5)$$

$$H=H\times 60 \quad (6)$$

$$\text{if } H<0, H=H+360 \quad (7)$$

$$V=\max(R,G,B) \quad (8)$$

$$S=(\max-\min)/\max \quad (9)$$

Figure 8:
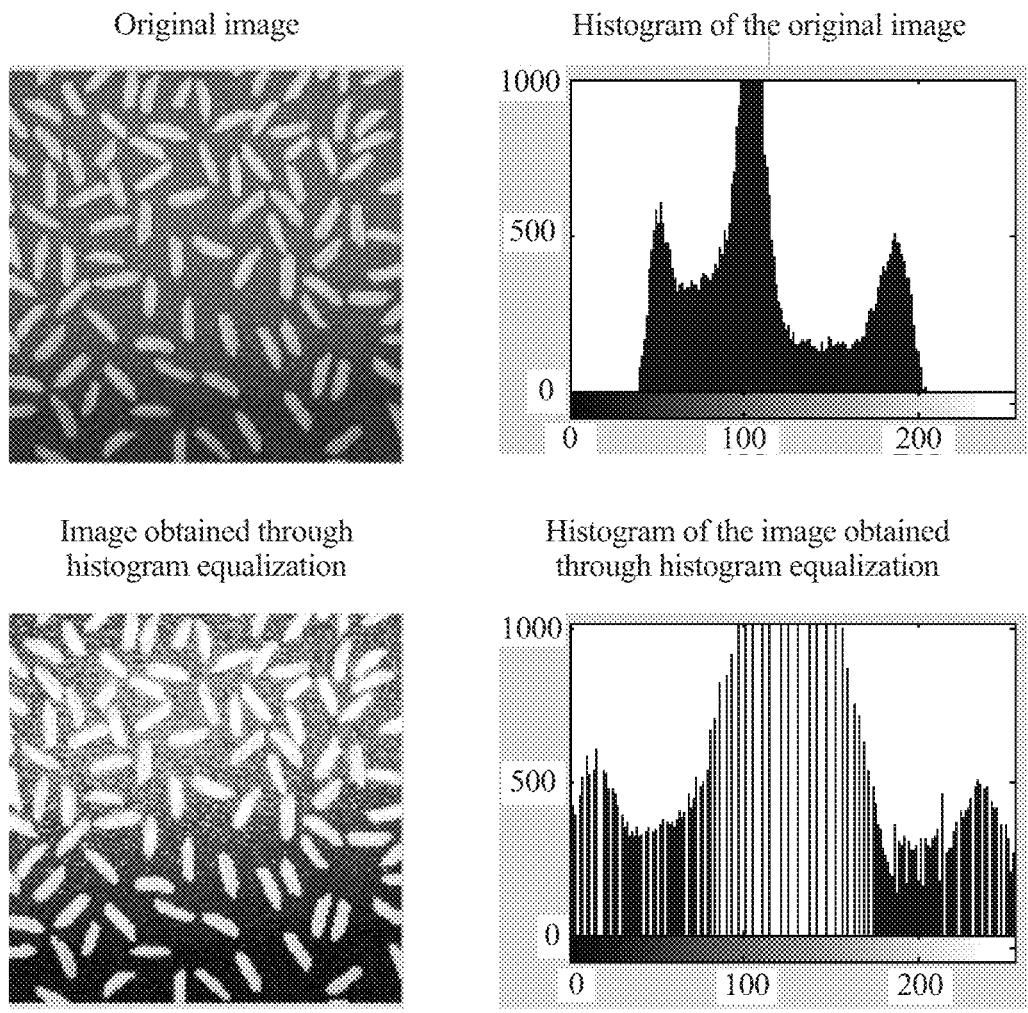
FIG. 8 is a schematic diagram of an effect of perforating histogram equalization.

For step 102, the to-be-processed color image may be an image captured by the photographing apparatus of the electronic device, or may be an image stored on the electronic device. In this case, equivalently, optional step 102 is directly selected while optional step 101 is omitted or step 102 is performed before step 101. If step 101 is performed before step 102, the to-be-processed image is a color image obtained after the color space conversion. FIG. 8 is a schematic diagram of an effect of performing histogram equalization. Usually, the histogram equalization is changing a distribution histogram of an original image on a channel from distribution in relatively centralized space to even distribution in all value ranges, and performing non-linear stretching on the image, so that an overall contrast of the image is increased. In a process of the histogram equalization, the following conditions are usually met:

(1) however a pixel is mapped, it certainly needs to make sure that an original size relationship remains unchanged, a relatively bright area is still relatively bright and a relatively dark area is still relatively dark except that the contrast is increased, and the relatively bright area and the relatively dark area certainly cannot be reversed;

(2) if the image is an 8-bit image, a value domain of a pixel mapping function should fall between 0 and 255 and cannot fall beyond the range; and (3) pixel values are evenly allocated by using a cumulative distribution function.

Step 105 includes but is not limited to the following three manners:

Manner 1:

1051*a*. Calculate a gradient value and a gradient direction, on each color channel, of each pixel in the color image.

1052*a*. Mark pixels whose maximum gradient values on all the color channels are greater than a third threshold as being in a first state.

1053*a*. Select, from a plurality of pixels marked as being in the first state, a pixel whose maximum gradient value on all the color channels is maximum as a start point, and perform line detection on all the color channels to obtain straight lines corresponding to all the color channels; and store a longest straight line in the straight lines that are obtained by performing the line detection starting from the start point and that are corresponding to all the color channels, add the longest straight line to a candidate document edge list, and mark a point on the longest straight line on all the color channels as being in a second state.

Step 1053*a* is repeatedly performed until all pixels in the color image are marked as being in the second state. (1) Specifically, a gradient is essentially calculating a derivative value of a two-dimensional discrete function of the image, and reflects a change in intensity of the image. The gradient includes two dimensions: a gradient value and a gradient direction. The gradient value reflects a specific magnitude of the change in the intensity of the image, and the gradient direction indicates a direction of a maximum change in the intensity of the image. A single hue channel is used as an example. If a value at a coordinate point (i, j) is h(i, j), a change dx(i, j) of the image at the point in an x-axis direction meets dx(i, j)=I(i+1, j)−I(i, j), and a change dy(i, j) of the image at the point in a y-axis direction meets dy(i, j)=I(i, j+1)−I(i, j). Therefore, a gradient value GradH(i, j) of a single hue channel image at the pixel (i, j) meets GradH(i, j)=dx(i, j)+dy(i, j). Similarly, a saturation channel gradient of the image at the pixel (i, j) is GradS(i, j), and a value channel gradient of the image at the pixel (i, j) is GradV(i, j). A maximum gradient value of each pixel on the three channels is defined as a gradient of the pixel, in other words, Grad(i, j)=max(GradH(i, j), GradS(i, j), GradV(i, j)), and then sorting is performed for all the pixels based on gradient values. If a gradient value of a pixel on a channel is greater than a threshold, the pixel is marked as being in the first state (for example, Unused). It should be understood that the gradient is a vector and the gradient value is a scalar.

A gradient direction at a pixel is a direction in which a change in brightness of an image is greatest. Usually, a change of brightness on a document edge is relatively apparent. A document edge direction is usually a direction perpendicular to the gradient direction, and herein, is used to determine a search direction of a straight line.

Figure 9:
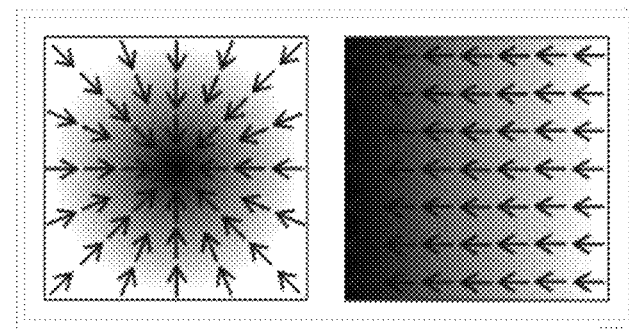
FIG. 9 is a schematic diagram of a gradient of an image and a gradient direction of the image.

FIG. 9 shows a gradient of an image and a gradient direction of the image.

(2) The pixel whose maximum gradient value on all the color channels is maximum is selected, as the start point, from a plurality of pixels marked as being in the first state (for example, Unused) in the image, and line detection is performed on all the color channels. A specific process of line detection on a single channel is as follows: A pixel marked as being in the first state is searched for in a direction perpendicular to a gradient direction of the point, and searching is not stopped until a quantity of pixels marked as being in the second state (for example, Used) in a search path exceeds a quantity (for example, the quantity is set to 3). If a quantity that is obtained through statistics collection and that is of pixels marked as being in the first state in the search direction exceeds a specific threshold, a straight line from the start point to a search end point is defined as a straight line on the color channel, and there are a plurality of straight lines on a plurality of color channels. Optionally, a condition may be further set to further limit the search end point. To be specific, an included angle between each pixel and the gradient direction of the start point is less than a threshold.

(3) Straight lines starting from the start point on different color channels are sorted based on lengths, a straight line with a maximum length is stored, the straight line with the maximum length is added to the candidate document edge list, and a point on the longest straight line on all the channels is marked as being in the second state (for example, Used).

(4) Steps (2) and (3) are continuously performed until all pixels are marked as being in the second state, and line detection for a candidate document ends.

Manner 2:

The following operations 1051*b* and 1052*b* are performed on each of all color channels of the start point.

1051*b*. Perform Canny edge detection on each of all multi-color channels in the color image, mark all detected edges on all the multi-color channels as edge points, and construct a multi-color channel hybrid edge.

1052*b*. Perform Hough (Hough) line detection on the edge points on the multi-channel hybrid edge, and add a detected straight line to a candidate document edge list.

(1.1) Specifically, Canny edge point detection is performed on each of different color channels in the image, detected edges on different channels are marked as edge points, and the multi-channel hybrid edge is constructed.

(1.2) Hough line detection is performed on the edge points on the multi-color channel hybrid edge, and the detected straight line is added to the candidate document edge list.

Figure 10:
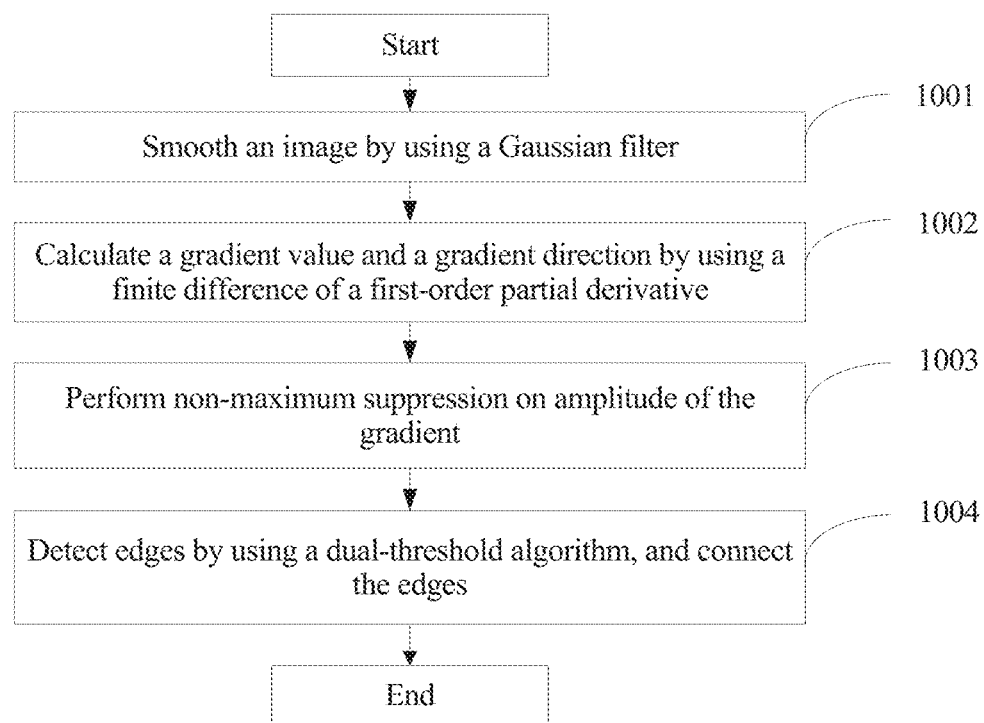
FIG. 10 is a flowchart of Canny edge detection.

A specific procedure of the Canny edge detection is shown in FIG. 10.

(1001) Smooth an image by using a Gaussian filter to remove image noise.

Convolution is performed on original data and a Gaussian kernel, and an obtained image is slightly blurred compared with the original image. In this way, a separate distinct pixel becomes a pixel that has nearly no impact on the image obtained through the Gaussian smoothing.

(1002) Calculate a gradient value (namely, amplitude of a gradient) and a gradient direction (namely, a direction of the gradient) by using a finite difference of a first-order partial derivative.

Edges in the image may point to different directions, and therefore four convolution templates are used to detect edges in horizontal, vertical, and diagonal directions during the Canny edge detection. Convolution of the original image and each convolution template is stored. A maximum value at each pixel and a direction of a generated edge are identified. In this way, a brightness gradient map and a brightness gradient direction of each pixel in the original image are generated from the image.

(1003) Perform non-maximum suppression on the amplitude of the gradient.

Figure 11:
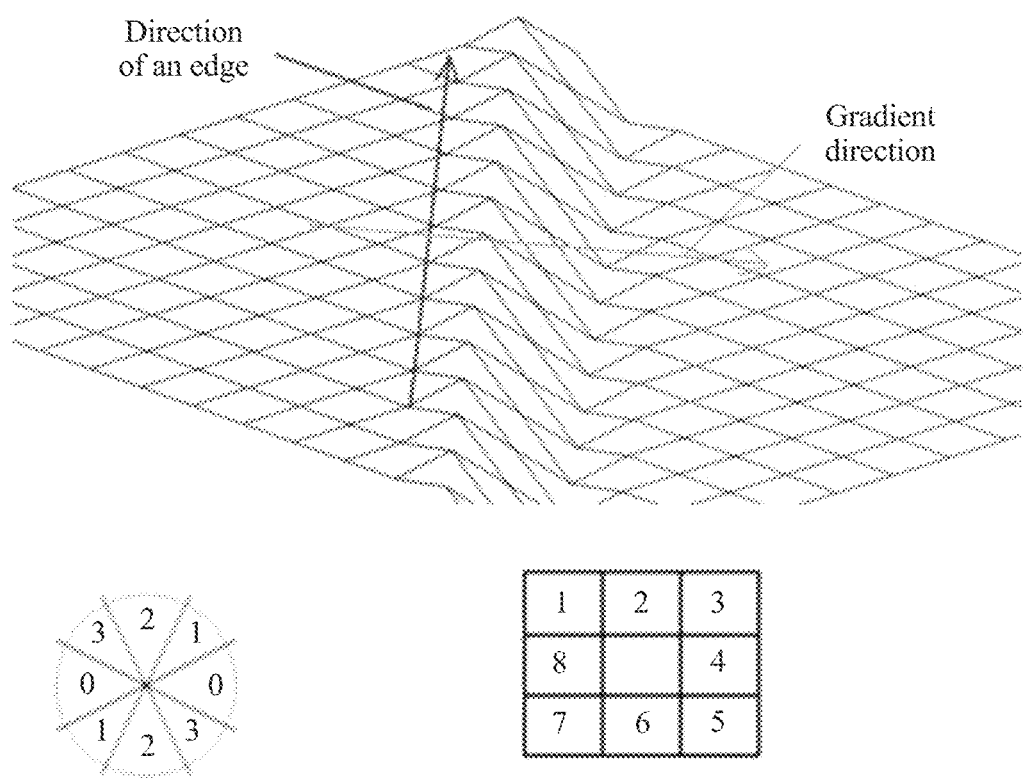
FIG. 11 is a schematic diagram of non-maximum suppression.

Only obtaining global gradients is not sufficient to determine an edge. Therefore, to determine the edge, a point with a maximum local gradient needs to be retained, and non-maximum suppression (non-maximum suppression, NMS for short) is performed. A specific solution is to use the direction of the gradient: A gradient angle is discretized to obtain one of four sectors of a circle, so that a suppression operation is performed by using a window of 3×3. The four sectors are numbered from 0 to 3 and are corresponding to four possible combinations of neighborhoods of 3×3. At each pixel, a central pixel of the neighborhood is compared with two pixels along a gradient line. If a gradient value of the central pixel is not greater than gradient values of the two adjacent pixels along the gradient line, the central pixel is set to 0. FIG. 11 is a schematic diagram of non-maximum suppression.

(1004) Detect edges by using a dual-threshold algorithm, and connect the edges.

A typical method for reducing a quantity of fake edges is the dual-threshold algorithm used to set all values less than a threshold to zero. The dual-threshold algorithm includes two thresholds: $\tau 1$ and $\tau 2$ that are used to perform non-maximum suppression on the image, and $2\tau 1 \approx \tau 2$, so that two threshold edge images can be obtained. An image with a value greater than the threshold includes very few fake edges, but is discontinuous (not closed), and an image with a value less than the threshold needs to be searched for an edge, so that the edge is connected to an edge of the original image with the value greater than the threshold to form a contour.

Figure 12:
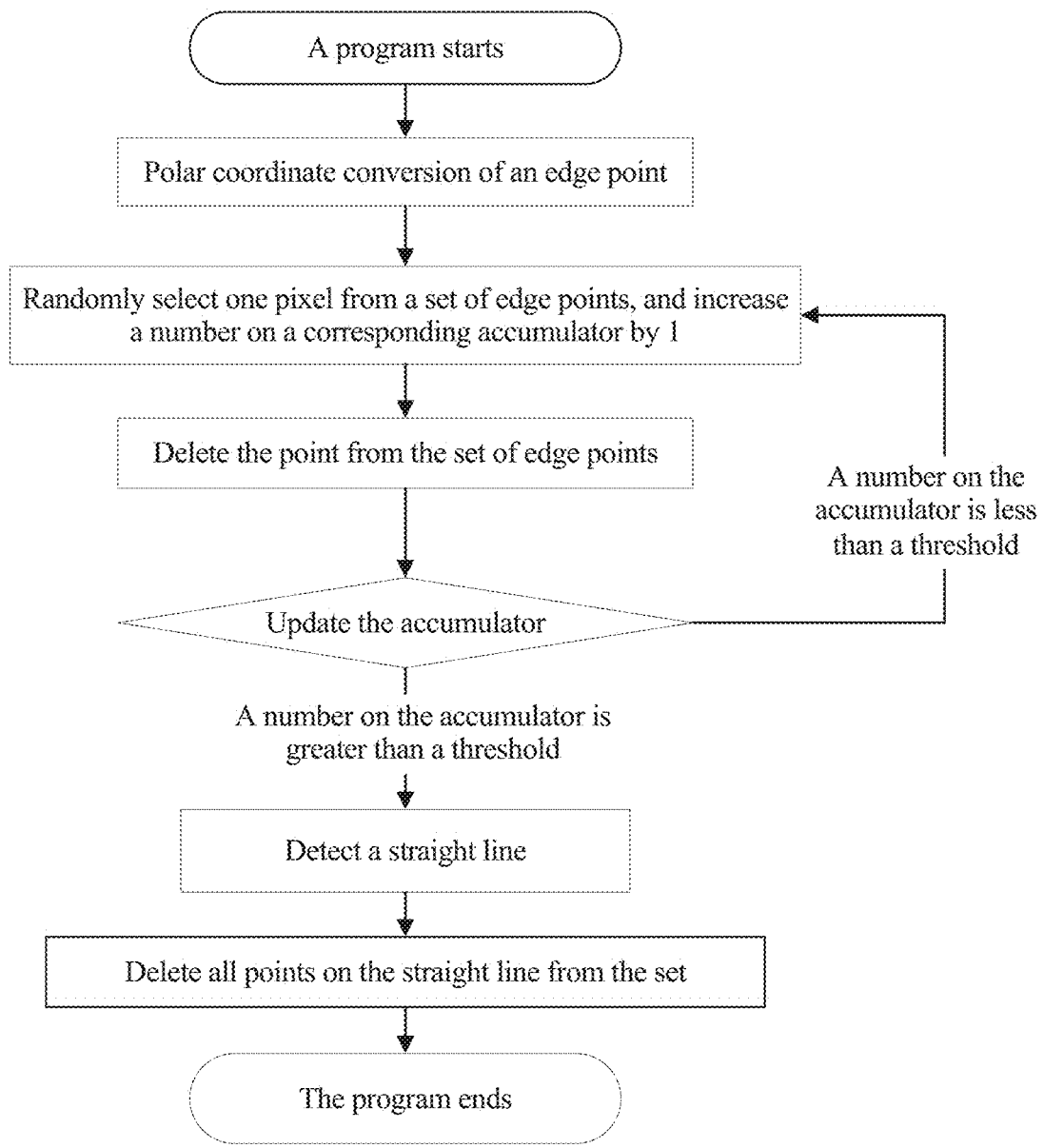
FIG. 12 is a schematic diagram of Hough line detection.

A procedure of Hough (Hough) line detection is shown in FIG. 12 and includes the following steps:

(1.2.1) Perform polar coordinate conversion on a set of edge points obtained through the Canny detection, where it can be learned from a straight-line equation that points on a same straight line in an original Cartesian coordinate system fall on same coordinates in a polar coordinate system. (1.2.2) Randomly select one pixel from polar coordinates corresponding to the set of edge points, and increase a number on a corresponding accumulator by 1.

(1.2.3) Delete the edge point from the set, and continue to repeatedly perform step (1.2.2) until there is no edge point on the polar coordinates.

(1.2.4) If a number on the accumulator corresponding to the pixel is greater than a threshold, mark the pixel as a straight line.

Manner 3:

1051*c*. Calculate complexity $x(i)$ of each color channel in the color image, where i is a color channel number, i=0, 1, . . . , or n−1, n is a quantity of color channels, and the complexity includes information entropy of the color image or a JPG compression rate of the color image.

1052*c*. Perform line detection on each color channel, sort straight lines based on values of lengths, select $m \times f(x(i))$ straight lines with relatively long lengths, and add the straight lines to a candidate document edge list, where $f(x(i))$ is a value between 0 and 1, m is a quantity of candidate document edges, and $m \times f(x(i))$ is a quantity of retained straight lines of a color channel i. It should be understood that "select $m \times f(x(i))$ straight lines with relatively long lengths" may be understood as selecting $m \times f(x(i))$ straight lines ranking higher in straight lines obtained by performing the line detection, and a sorting rule is that the straight lines are arranged in descending order of lengths. In addition, for example, $f(x(i))=1-x(i)/\text{sum}(x(i))$.

Step 107 of detecting a quadrilateral based on preset condition and some or all of straight lines obtained by performing the line detection includes:

classifying, into four types based on tilt angles and locations, candidate straight lines obtained by performing the line detection, where the four types include: up, down, left, and right;

cyclically selecting a straight line from each type of straight line, and constructing a set of quadrilaterals based on the preset condition; and selecting, from the set of quadrilaterals, a quadrilateral with a maximum ratio as a result of edge detection, where the ratio is a value obtained by dividing the quantity of actually detected edge pixels by a circumference of a fitting quadrilateral.

It should be understood that the preset condition include that a value of an included angle between opposite sides of the quadrilateral is less than a first threshold (for example, a value range of the first threshold is 0 degree to 50 degrees), a value of an included angle between adjacent sides of the quadrilateral falls within a preset angle value domain (for example, the preset angle value domain is 60 degrees to 120 degrees), and a distance between the opposite sides of the quadrilateral is greater than a second threshold (for example, the second threshold is ⅕ of a length of a corresponding side of the image), where the first threshold is an integer greater than zero, and the second threshold is an integer greater than zero.

Figure 13:
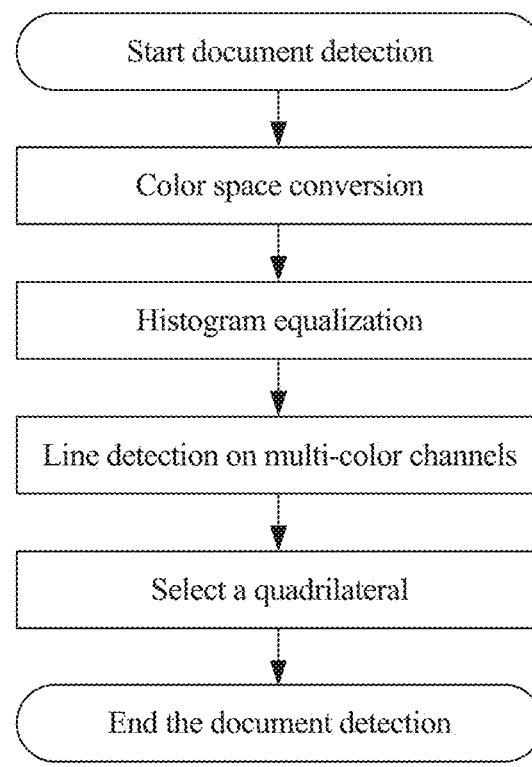
FIG. 13 is a flowchart of document edge detection according to some embodiments.

Based on the foregoing technical solutions, an optional solution is shown in FIG. 13. For specific steps, refer to the foregoing corresponding description. Details are not described herein again.

Figure 14:
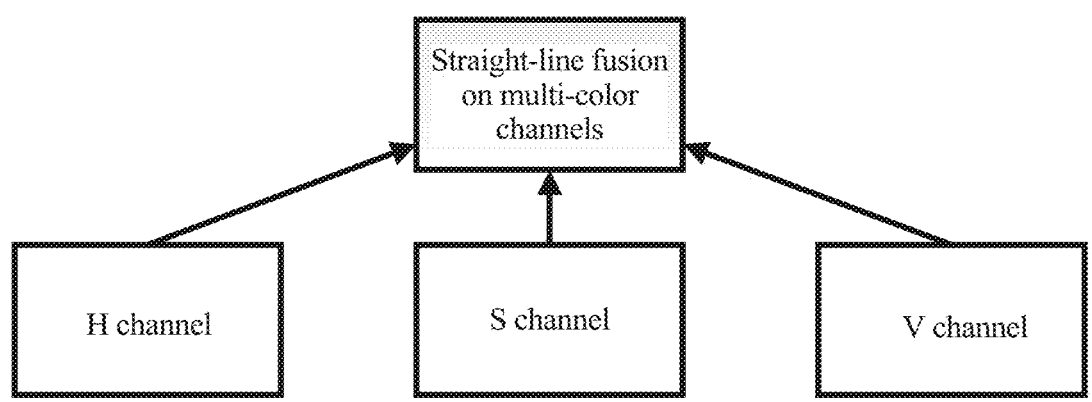
FIG. 14 is a schematic diagram of straight-line fusion on multi-color channels.

It should be understood that, "detecting a quadrilateral based on preset condition and some or all of straight lines obtained by performing the line detection" in step 107 may be understood as straight-line fusion on multi-color channels. To be specific, each color channel provides some edges, and finally edges are fused into one quadrilateral, as shown in FIG. 14.

Figure 15:
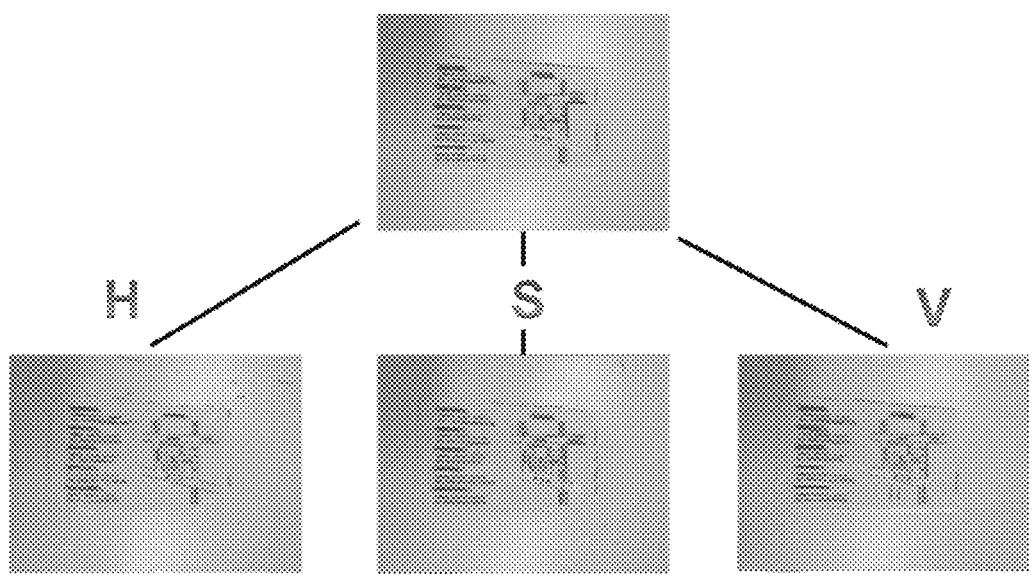
FIG. 15 is a schematic diagram of an effect of straight-line fusion on multi-color channels.

In the foregoing described technical solution, line detection is performed, on the multi-color channels, on straight lines on local edges at different locations of the image, straight-line fusion is performed on the multi-color channels, and a longest straight line obtained through detection on different color channels in a same local area is added to a candidate edge list. As shown in FIG. 15, light on a left side of a card is different from that on a right side of the card, a detection effect of a V channel on a left edge is better, and a detection effect of an S channel on a right edge is more ideal.

Figure 16:
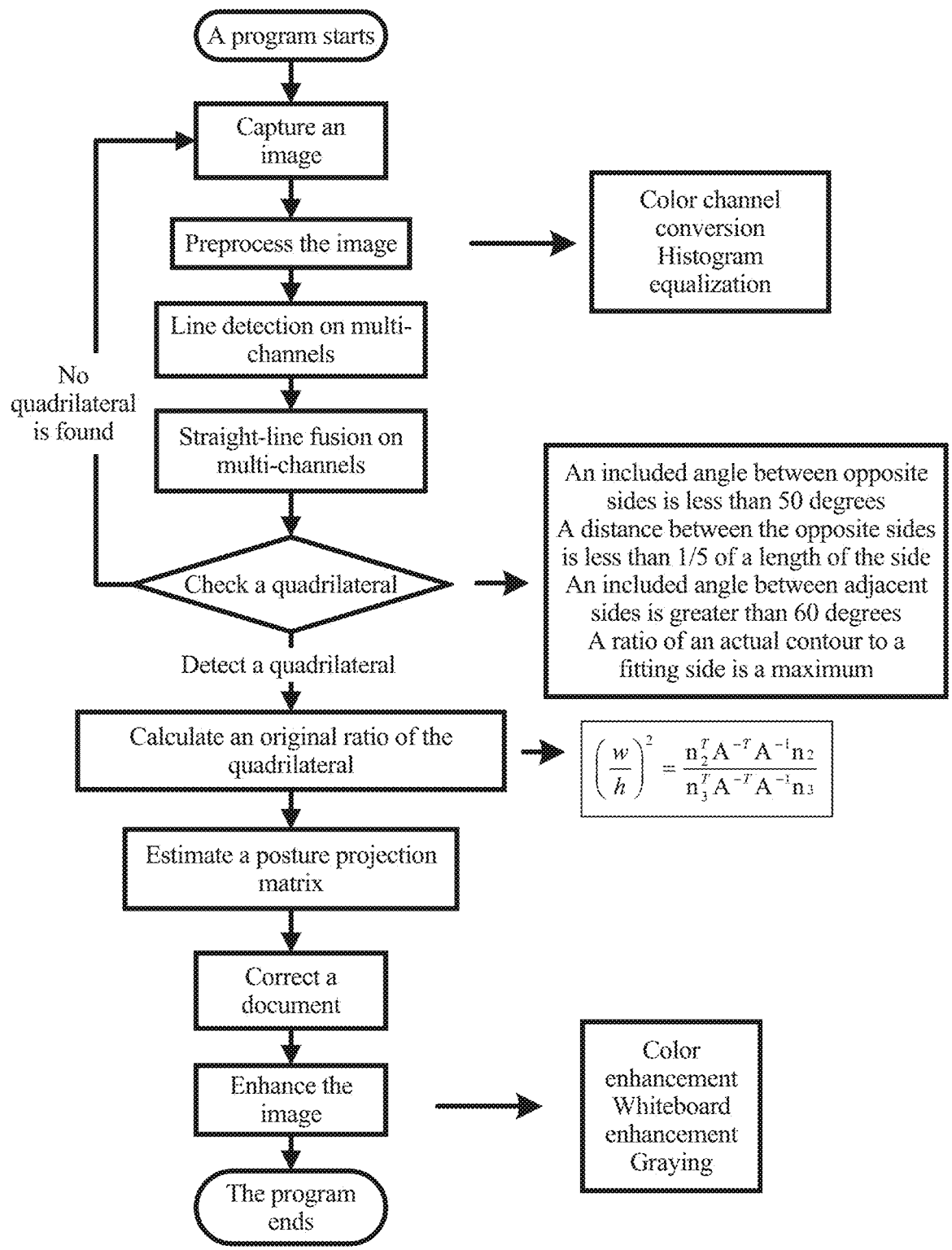
FIG. 16 is a flowchart of document edge detection according to some embodiments.

Based on the foregoing technical solutions, an optional solution is shown in FIG. 16. For steps that are the same as the foregoing steps, refer to the foregoing corresponding description. Details are not described herein again. Optionally, after step 107, at least one of the following processing is performed on the detected quadrilateral: estimating an original ratio of the quadrilateral; estimating a posture projection matrix; correcting the quadrilateral; or enhancing the image. FIG. 16 is a schematic diagram including all optional steps. An effect of a final output image becomes better as more of these optional steps are used. For example, before the quadrilateral is detected, an image preprocessing operation is added, to further increase a success rate of detecting a document edge when the document edge and a background in which the document is located are not very distinct from each other. For another example, after the quadrilateral is detected, some or all of the optional steps in FIG. 16 are added, to further implement document correction, so that the electronic device can output a clear rectangular document when photographing a document at a tilt angle.

Figure 17:
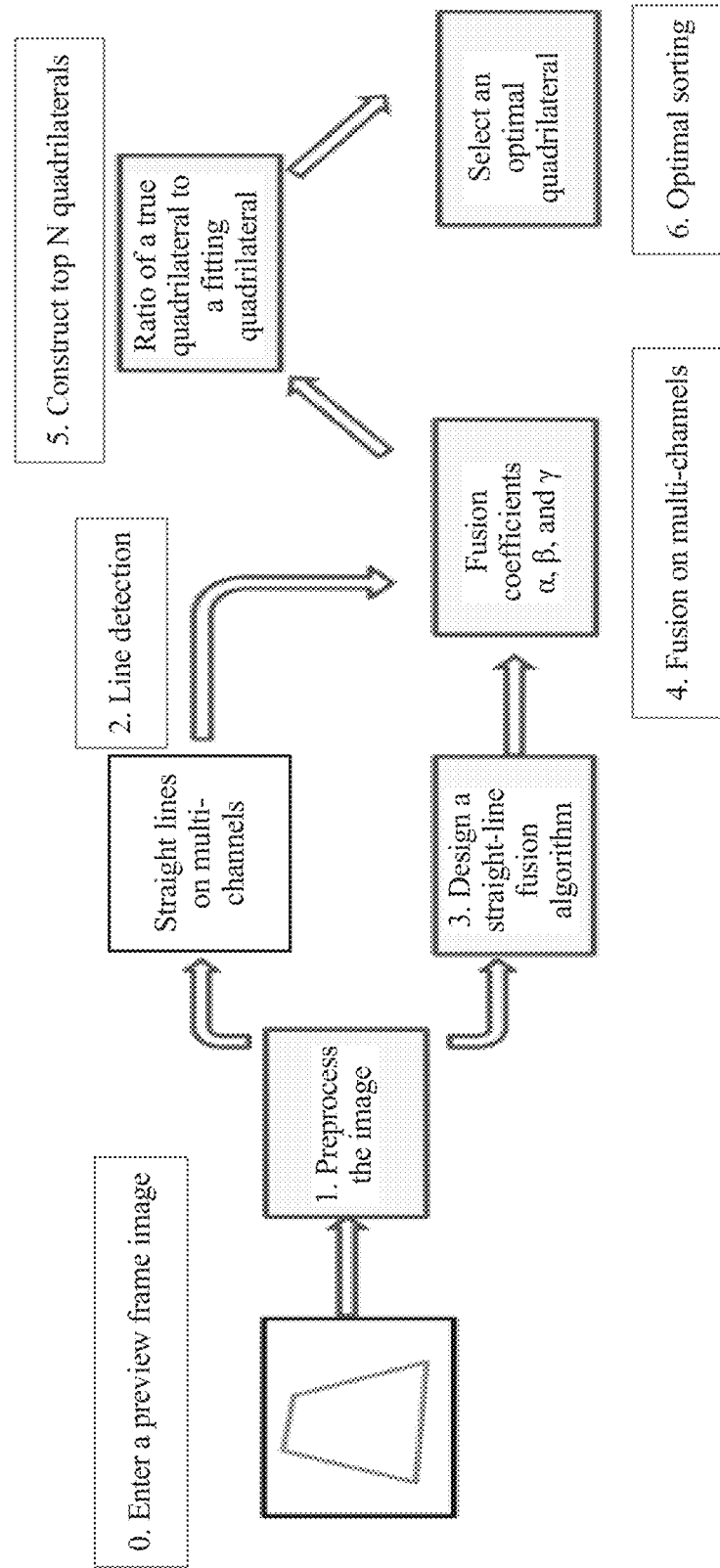
FIG. 17 is a flowchart of a document edge detection algorithm according to some embodiments.
Figure 18:
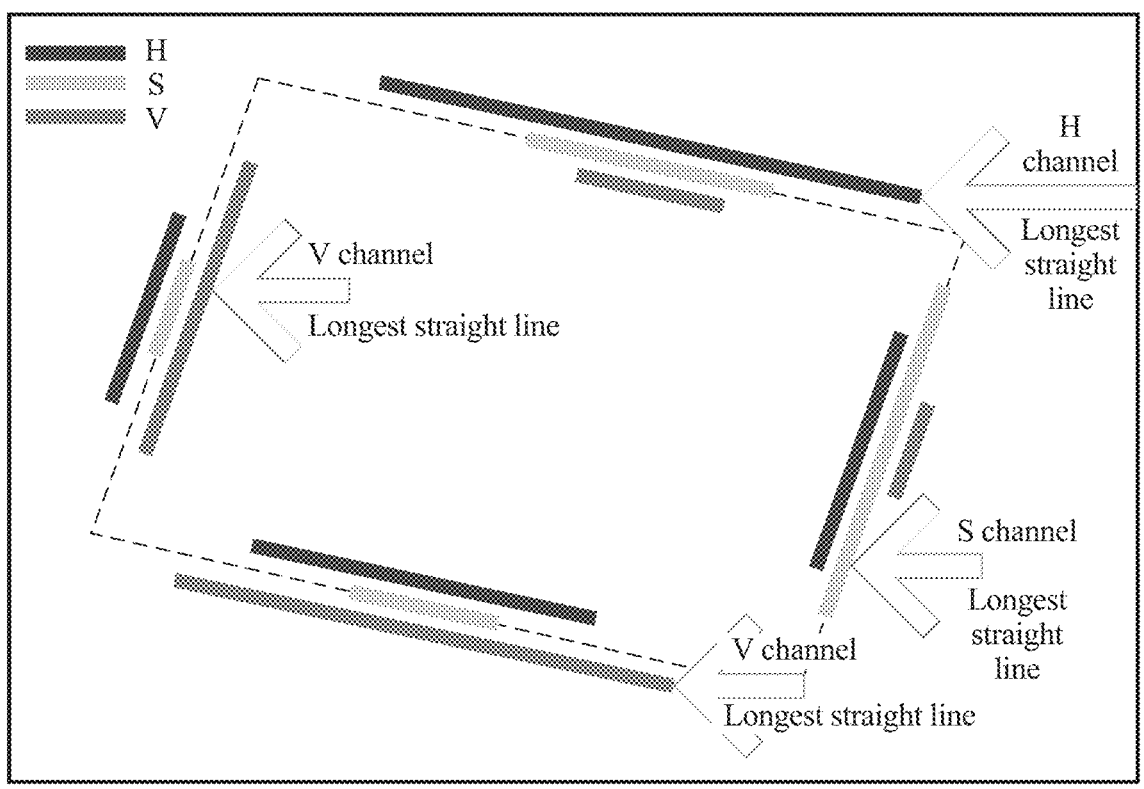
FIG. 18 is a schematic diagram of straight-line fusion on multi-color channels.

Based on the foregoing technical solutions, FIG. 17 is a flowchart of an optional document edge detection algorithm of multi-color channels. For a processing procedure of straight-line fusion on multi-color channels, refer to FIG. 18. For specific steps, refer to the foregoing corresponding description. Details are not described herein again.

Figure 19:
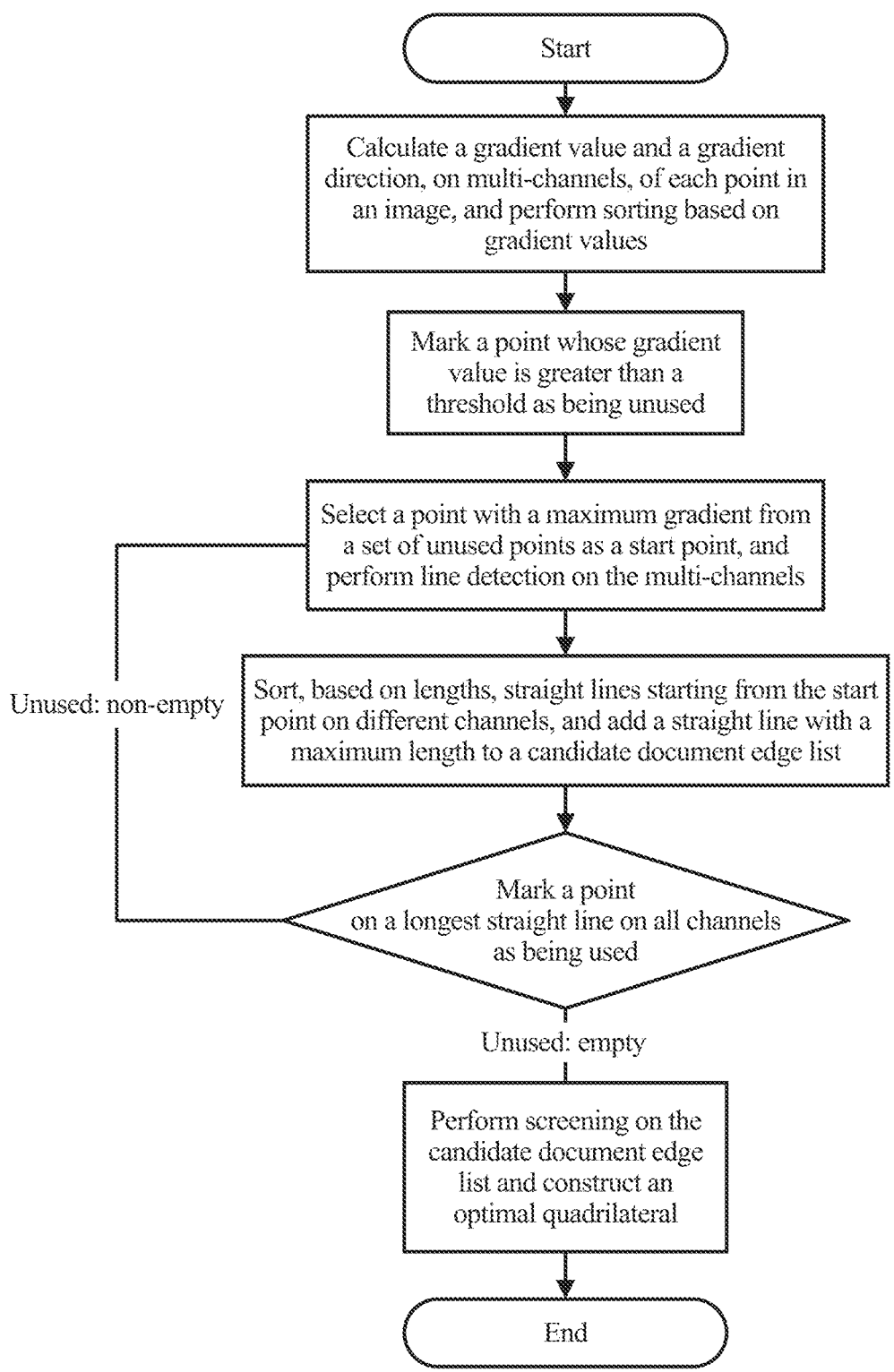
FIG. 19 is a flowchart of document edge detection according to some embodiments.

Based on the foregoing technical solutions, an optional solution is shown in FIG. 19. For steps that are the same as the foregoing steps, refer to the foregoing corresponding description. Details are not described herein again. It should be noted that Sobel edge detection is an alternative solution of the Canny edge detection, and another edge detection technology may be used.

Figure 20:
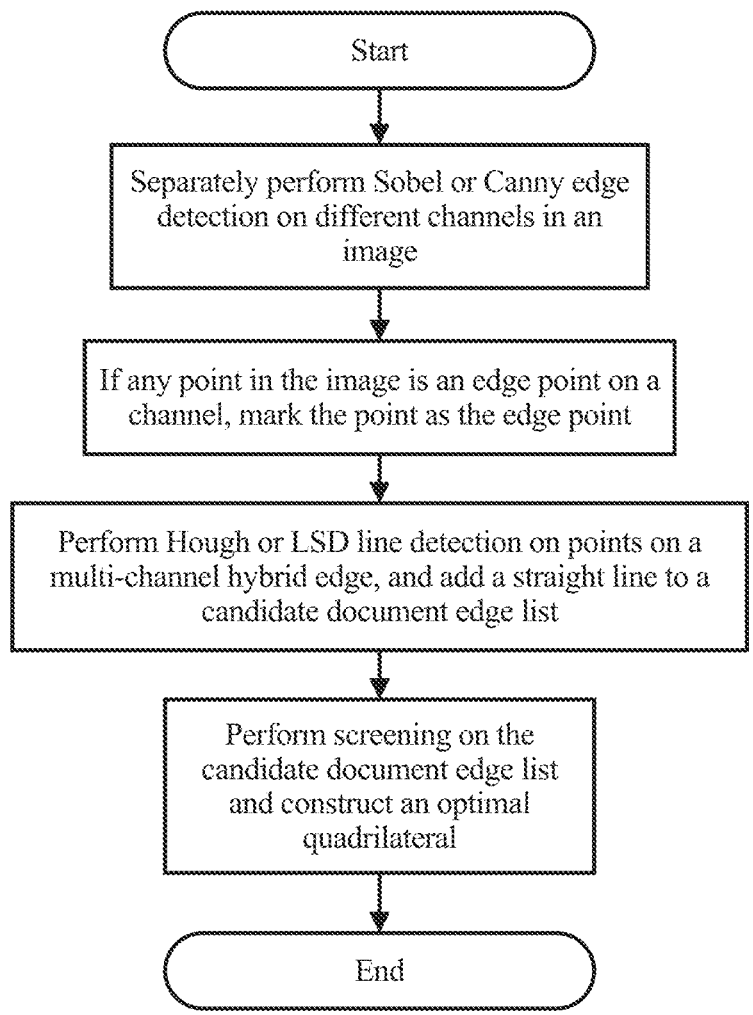
FIG. 20 is a flowchart of document edge detection according to some embodiments.

Based on the foregoing technical solutions, an optional solution is shown in FIG. 20. For steps that are the same as the foregoing steps, refer to the foregoing corresponding description. Details are not described herein again.

Figure 21:
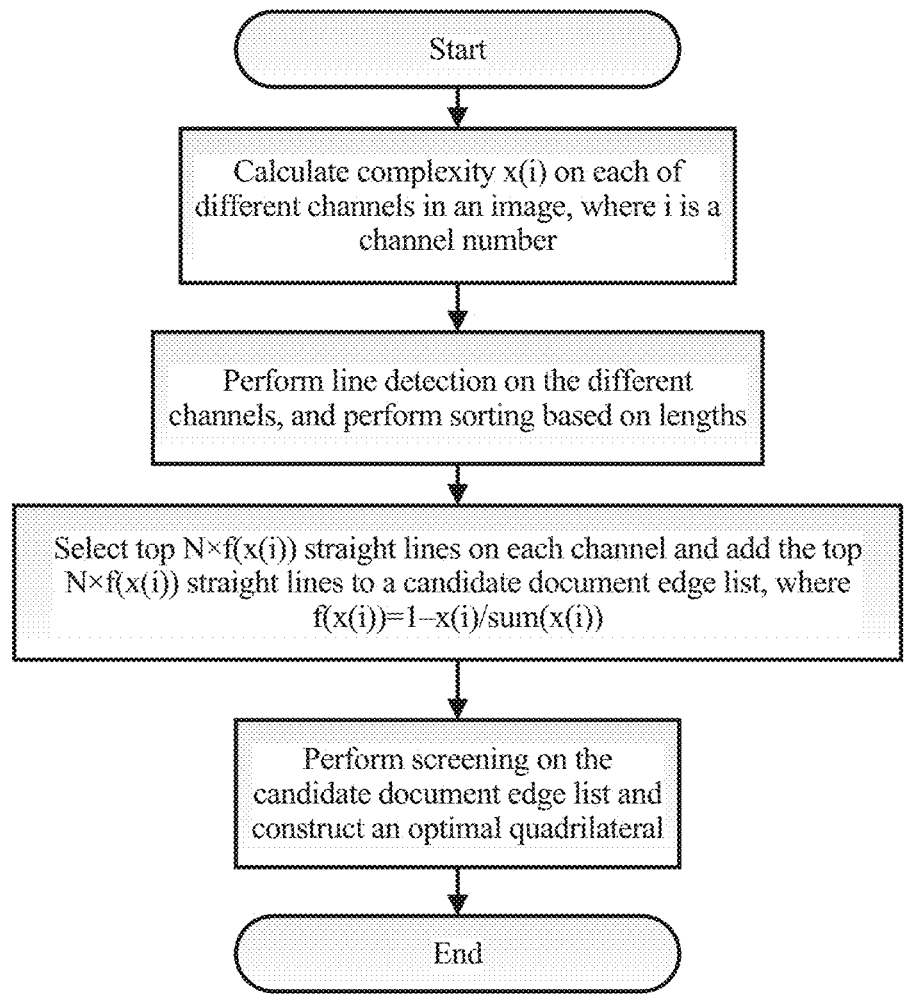
FIG. 21 is a flowchart of document edge detection according to some embodiments.

Based on the foregoing technical solutions, an optional solution is shown in FIG. 21. For steps that are the same as the foregoing steps, refer to the foregoing corresponding description. Details are not described herein again.

Figure 22:
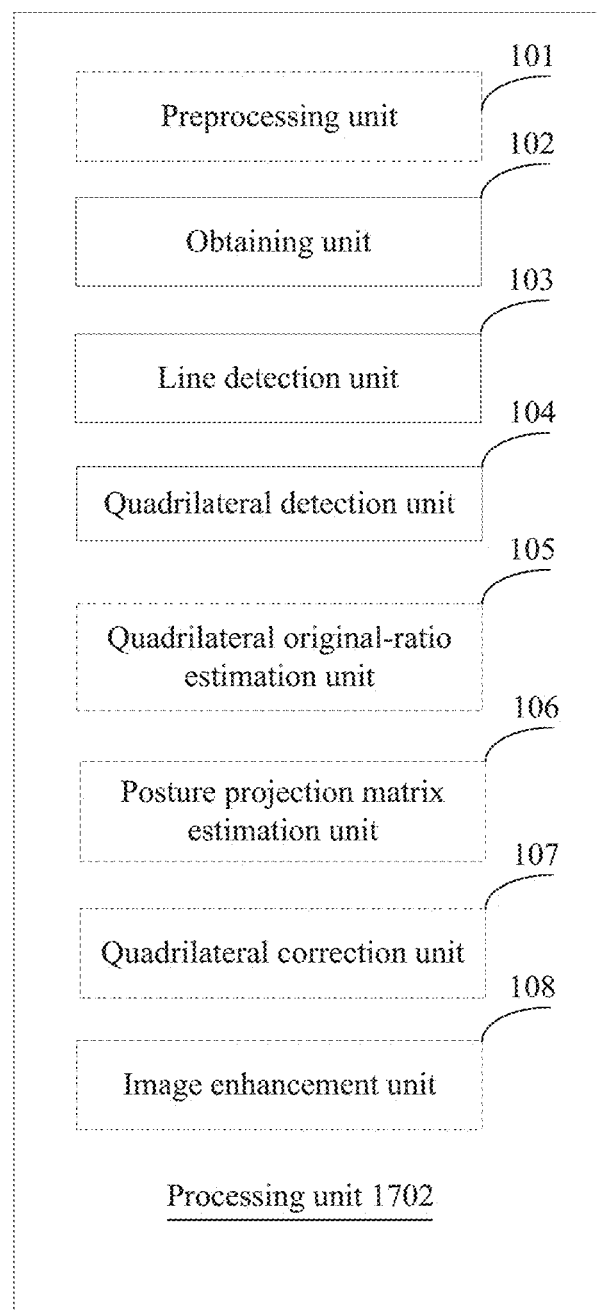
FIG. 22 is a functional block diagram of a processing unit.

FIG. 22 is a functional block diagram of a processing unit according to some embodiments. A processing unit 1702 in FIG. 22 may be the processor 120 in FIG. 1B and FIG. 2. Alternatively, the processing unit 1702 in FIG. 22 may be the central processing unit 310 in FIG. 3A. Alternatively, the processing unit 1702 in FIG. 22 may be a coprocessor that is not shown in FIG. 1A and FIG. 1B, or FIG. 2. Alternatively, the processing unit 1702 in FIG. 22 may be a graphics processing unit (Graphics Processing Unit, GPU for short) that is not shown in FIG. 1A and FIG. 1B, or FIG. 2. Alternatively, the processing unit 1702 in FIG. 22 may be a coprocessor that is not shown in FIG. 3A, FIG. 3B, or FIG. 3C. Alternatively, the processing unit 1702 in FIG. 22 may be a graphics processing unit that is not shown in FIG. 3A, FIG. 3B, or FIG. 3C. A function module of the processing unit 1702 may be implemented by hardware, software, or a combination of software and hardware to execute the principles of the present invention. A person skilled in the art can understand that function blocks in FIG. 22 may be combined or divided into sub-blocks to implement the foregoing principles of the present invention. Therefore, the description in this specification may support any possible combination or division or further limitation of the function blocks in this specification. It should be understood that the processing unit may be a processor, or may be a coprocessor.

As shown in FIG. 22, the processing unit 1702 includes: an obtaining unit 102, where the obtaining unit 102 is configured to obtain multi-color channel data of each pixel in a color image, where the multi-color channel data includes two-dimensional coordinate values of the pixel and a value of the pixel on each color channel; a line detection unit 103, where the line detection unit 103 is coupled to the obtaining unit 102, and the line detection unit 103 is configured to perform line detection on the multi-color channel data of each pixel in the color image; and a quadrilateral detection unit 104, where the quadrilateral detection unit 104 is coupled to the line detection unit 103, and the quadrilateral detection unit 104 is configured to detect a quadrilateral based on preset condition and some or all of straight lines obtained by performing the line detection, where the preset condition include that a value of an included angle between opposite sides of the quadrilateral is less than a first threshold, a value of an included angle between adjacent sides of the quadrilateral falls within a preset angle value domain, and a distance between the opposite sides of the quadrilateral is greater than a second threshold, where the first threshold is an integer greater than zero, and the second threshold is an integer greater than zero.

Optionally, the preset condition further include that a ratio of a quantity of actually detected edge pixels to a circumference of the quadrilateral is maximum.

Optionally, the processing unit 1702 further includes a preprocessing unit 101, where the preprocessing unit 101 is configured to: before the multi-color channel data of each pixel in the color image is obtained, further preprocess the color image, where the preprocessing includes color space conversion and/or histogram equalization.

Optionally, the processing unit 1702 further includes at least one of a quadrilateral original-ratio estimation unit 105, a posture projection matrix estimation unit 106, a quadrilateral correction unit 107, and an image enhancement unit 108. The quadrilateral original-ratio estimation unit 105 is configured to estimate an original ratio of the detected quadrilateral. The posture projection matrix estimation unit 106 is configured to estimate a posture projection matrix of the input quadrilateral. The quadrilateral correction unit 107 is configured to correct the input quadrilateral. The image enhancement unit 108 is configured to enhance the input image.

The foregoing describes functions of the processing unit 1702. A person of ordinary skill in the art may understand that the following functions are corresponding to embodiments of the electronic device, the system, the apparatus, the method, the graphical user interface, the information processing apparatus (for example, a processor chip or a processor chip set), and the computer readable storage medium that are described in this specification, and various combinations thereof are combinations that may be directly undoubtedly conceived by a person of ordinary skill in the art after the person understands this specification.

It should be understood that a person of ordinary skill in the art may realize, by understanding this specification, that the foregoing operations described with reference to FIG. 5 to FIG. 21 may be implemented by the components shown in FIG. 1A and FIG. 1B, FIG. 3A to FIG. 3C, or FIG. 22. Similarly, a person skilled in the art clearly knows how to implement another process based on the components shown in FIG. 1A and FIG. 1B, FIG. 3A to FIG. 3C, or FIG. 22.

For a purpose of explanation, the foregoing description is described with reference to a specific embodiment. However, the foregoing example discussion is not intended to be detailed, and is not intended to limit the present invention to a disclosed precise form. According to the foregoing teaching content, many modification forms and variation forms are possible. Embodiments are selected and described to fully illustrate the principles of the present invention and practical application of the principles, so that another person skilled in the art can use the present invention and various embodiments that have various modifications applicable to conceived specific usage.

What is claimed is:

1. An electronic device, comprising:
   a display;
   one or more processors;
   a memory;
   a plurality of applications; and
   one or more programs, wherein the one or more programs are stored in the memory and configured to be executed by the one or more processors, the one or more programs comprise instructions that cause the electronic device to perform the following operations:
   obtaining multi-color channel data of each pixel in a color image, wherein the multi-color channel data comprises two-dimensional coordinate values of the pixel and a value of the pixel on each color channel;

performing line detection on the multi-color channel data of each pixel in the color image; and detecting a quadrilateral based on preset condition and one or more straight lines obtained by performing the line detection, wherein the preset condition comprise that a value of an included angle between opposite sides of the quadrilateral is less than a first threshold, a value of an included angle between adjacent sides of the quadrilateral falls within a preset angle value domain, or a distance between the opposite sides of the quadrilateral is greater than a second threshold, wherein the first threshold is an integer greater than zero, and the second threshold is an integer greater than zero.

2. The electronic device according to claim 1, wherein the preset condition further comprise that a ratio of a quantity of actually detected edge pixels to a circumference of the quadrilateral is maximum.

3. The electronic device according to claim 1, wherein the operations further comprise:

before the obtaining multi-color channel data of each pixel in a color image, preprocessing the color image, wherein the preprocessing comprises at least one of color space conversion or histogram equalization.

4. The electronic device according to claim 1, wherein the performing line detection on the multi-color channel data of each pixel in the color image comprises:

calculating a gradient value and a gradient direction, on each color channel, of each pixel in the color image;

marking pixels whose maximum gradient values on the color channels are greater than a third threshold as being in a first state;

selecting, from a plurality of pixels marked as being in the first state, a pixel whose maximum gradient value on the color channels is maximum as a start point, and performing line detection on the color channels to obtain straight lines corresponding to the color channels; and storing a longest straight line in the straight lines that are obtained by performing the line detection starting from the start point and that are corresponding to the color channels, adding the longest straight line to a candidate document edge list, and marking a point on the longest straight line on the color channels as being in a second state; and repeating the selecting a pixel, the performing line detection on the color channels, and the storing a longest straight line until all pixels in the color image are marked as being in the second state.

5. The electronic device according to claim 4, wherein the selecting, from a plurality of pixels marked as being in the first state, a pixel whose maximum gradient value on the color channels is maximum as a start point, and performing line detection on the color channels to obtain straight lines corresponding to the color channels comprises:

performing the following operations on each of the color channels of the start point:

searching, in a direction perpendicular to a gradient direction of the start point, for a pixel marked as being in the second state, until a quantity of pixels marked as being in the second state in a search path is greater than a third threshold; and determining a straight line obtained by performing the line detection, wherein two endpoints of the straight line are the start point and an end point that is in the search path, and a quantity of pixels marked as being in the first state in the search path is greater than a fourth threshold.

6. The electronic device according to claim 1, wherein the performing line detection on the multi-color channel data of each pixel in the color image comprises:

performing Canny edge detection on each of multi-color channels in the color image, marking detected edges on the multi-color channels as edge points, and constructing a multi-color channel hybrid edge; and performing Hough line detection on the edge points on the multi-color channel hybrid edge, and adding a detected straight line to a candidate document edge list.

7. The electronic device according to claim 1, wherein the performing line detection on the multi-color channel data of each pixel in the color image comprises:

calculating complexity $x(i)$ of each color channel in the color image, wherein i is a color channel number, i=0, 1, . . . , or n−1, n is a quantity of color channels, and the complexity $x(i)$ comprises information entropy of the color image or a JPG compression rate of the color image; and performing line detection on each color channel;

sorting straight lines based on values of lengths;

selecting $m \times f(x(i))$ straight lines with relatively long lengths; and adding the straight lines to a candidate document edge list, wherein $f(x(i))$ is a value between 0 and 1, m is a quantity of candidate document edges, and $m \times f(x(i))$ is a quantity of retained straight lines of a color channel i.

8. The electronic device according to claim 1, wherein the detecting a quadrilateral based on preset condition and one or more straight lines obtained by performing the line detection comprises:

classifying, into four types based on tilt angles and locations, candidate straight lines obtained by performing the line detection, wherein the four types comprise: up, down, left, and right;

cyclically selecting a straight line from each type of straight line;

constructing a set of quadrilaterals based on the preset condition; and selecting, from the set of quadrilaterals, a quadrilateral with a maximum ratio as a result of edge detection, wherein the maximum ratio is a value obtained by dividing a quantity of actually detected edge pixels by a circumference of a fitting quadrilateral.

9. The electronic device according to claim 1, wherein the operations further comprise: performing at least one of the following processing on the detected quadrilateral:

estimating an original ratio of the quadrilateral;

estimating a posture projection matrix;

correcting the quadrilateral; or enhancing the color image.

10. A method, applied to an electronic device, wherein the method comprises:

obtaining multi-color channel data of each pixel in a color image, wherein the multi-color channel data comprises two-dimensional coordinate values of the pixel and a value of the pixel on each color channel;

performing line detection on the multi-color channel data of each pixel in the color image; and detecting a quadrilateral based on preset condition and one or more straight lines obtained by performing the line detection, wherein the preset condition comprise that a value of an included angle between opposite sides of the quadrilateral is less than a first threshold, a value of an included angle between adjacent sides of the quadrilateral falls within a preset angle value domain, or a distance between the opposite sides of the quadrilateral is greater than a second threshold, wherein the first threshold is an integer greater than zero, and the second threshold is an integer greater than zero.

11. The method according to claim 10, wherein the preset condition further comprise that a ratio of a quantity of actually detected edge pixels to a circumference of the quadrilateral is maximum.

12. The method according to claim 10, further comprising:
before the obtaining multi-color channel data of each pixel in a color image, preprocessing the color image, wherein the preprocessing comprises at least one of color space conversion or histogram equalization.

13. The method according to claim 10, wherein the performing line detection on the multi-color channel data of each pixel in the color image comprises:
calculating a gradient value and a gradient direction, on each color channel, of each pixel in the color image;
marking pixels whose maximum gradient values on the color channels are greater than a third threshold as being in a first state; and
selecting, from a plurality of pixels marked as being in the first state, a pixel whose maximum gradient value on the color channels is maximum as a start point, and performing line detection on the color channels to obtain straight lines corresponding to the color channels; and storing a longest straight line in the straight lines that are obtained by performing the line detection starting from the start point and that are corresponding to the color channels, adding the longest straight line to a candidate document edge list, and marking a point on the longest straight line on the color channels as being in a second state; and
repeating the selecting a pixel, the performing line detection on the color channels, and the storing a longest straight line until all pixels in the color image are marked as being in the second state.

14. The method according to claim 13, wherein the selecting, from a plurality of pixels marked as being in the first state, a pixel whose maximum gradient value on the color channels is maximum as a start point, and performing line detection on the color channels to obtain straight lines corresponding to the color channels comprises:
performing the following operations on each of color channels of the start point:
searching, in a direction perpendicular to a gradient direction of the start point, for a pixel marked as being in the second state, until a quantity of pixels marked as being in the second state in a search path is greater than a third threshold; and
determining a straight line obtained by performing the line detection, wherein two endpoints of the straight line are the start point and an end point that is in the search path, and a quantity of pixels marked as being in the first state in the search path is greater than a fourth threshold.

15. The method according to claim 10, wherein the performing line detection on the multi-color channel data of each pixel in the color image comprises:
performing Canny edge detection on each of multi-color channels in the color image, marking detected edges on the multi-color channels as edge points, and constructing a multi-color channel hybrid edge; and
performing Hough line detection on the edge points on the multi-color channel hybrid edge, and adding a detected straight line to a candidate document edge list.

16. The method according to claim 10, wherein the performing line detection on the multi-color channel data of each pixel in the color image comprises:
calculating complexity $x(i)$ of each color channel in the color image, wherein i is a color channel number, $i=0, 1, \ldots,$ or $n-1$, n is a quantity of color channels, and the complexity $x(i)$ comprises information entropy of the color image or a JPG compression rate of the color image; and
performing line detection on each color channel;
sorting straight lines based on values of lengths;
selecting $m \times f(x(i))$ straight lines with relatively long lengths; and
adding the straight lines to a candidate document edge list, wherein $f(x(i))$ is a value between 0 and 1, m is a quantity of candidate document edges, and $m \times f(x(i))$ is a quantity of retained straight lines of a color channel i.

17. The method according to claim 10, wherein the detecting a quadrilateral based on preset condition and one or more straight lines obtained by performing the line detection comprises:
classifying, into four types based on tilt angles and locations, candidate straight lines obtained by performing the line detection, wherein the four types comprise: up, down, left, and right;
cyclically selecting a straight line from each type of straight line;
constructing a set of quadrilaterals based on the preset condition; and
selecting, from the set of quadrilaterals, a quadrilateral with a maximum ratio as a result of edge detection, wherein the maximum ratio is a value obtained by dividing a quantity of actually detected edge pixels by a circumference of a fitting quadrilateral.

18. The method according to claim 10, further comprising:
performing at least one of the following processing on the detected quadrilateral:
estimating an original ratio of the quadrilateral;
estimating a posture projection matrix;
correcting the quadrilateral; or
enhancing the color image.

19. A computer readable storage medium storing one or more programs, wherein the one or more programs comprise an instruction, and when the instruction is executed by an electronic device with an accelerometer and a magnetometer, the electronic device performs the following operations:
obtaining multi-color channel data of each pixel in a color image, wherein the multi-color channel data comprises two-dimensional coordinate values of the pixel and a value of the pixel on each color channel;
performing line detection on the multi-color channel data of each pixel in the color image; and
detecting a quadrilateral based on preset condition and one or more straight lines obtained by performing the line detection, wherein the preset condition comprise that a value of an included angle between opposite sides of the quadrilateral is less than a first threshold, a value of an included angle between adjacent sides of the quadrilateral falls within a preset angle value domain, or a distance between the opposite sides of the quadrilateral is greater than a second threshold, wherein the first threshold is an integer greater than zero, and the second threshold is an integer greater than zero.

20. The computer readable storage medium according to claim 19, wherein
the preset condition further comprise that a ratio of a quantity of actually detected edge pixels to a circumference of the quadrilateral is maximum.

* * * * *